INVENTORS.
WILLIAM S. TANDLER &
MORRIS GROSSMAN their ATTORNEYS.

United States Patent Office 2,985,038
Patented May 23, 1961

2,985,038
PEG AND PAWL POSITIONING SYSTEM

William S. Tandler, New York, and Morris Grossman, Brooklyn, N. Y., assignors, by mesne assignments, to The Warner and Swasey Company, Cleveland, Ohio, a corporation of Ohio Filed Apr. 8, 1958, Ser. No. 727,225

12 Claims. (Cl. 74—815)

This invention relates to improvements in the peg and pawl positioning system disclosed in our United States Patent 2,807,175.

The patent just mentioned is concerned with the problem of precisely positioning a workpiece upon which a gauging operation is to be performed. As a simplified explanation of how this problem is solved, in the embodiment disclosed in the patent the workpiece is mounted on an arbor to which is coupled a rotary indexing head having a plurality of axially extending pins (i.e., pegs) at equal angular intervals around its circumference. Any one of these pins may be selected to cooperate with a positioning pawl having a tooth which, at a selected time, is slipped behind the selected pin so that the pin will be stopped by a bearing face of the tooth when the head is rotated to bring the pin into contact with the tooth. As described in detail in the patent, the bearing face makes a slight angle with the intersecting radius from the center of the head, and means are provided in connection with each pin to selectively fix the amount by which the bearing face will be radially advanced towards the center of the indexing head when the face is in contact with the pin. In this manner, it is impossible to correct with a high degree of accuracy for small departures of the pins from those circumferential positions thereof which would exactly divide the head circumference into equal angular intervals.

The sequence of operation of the system is as follows. With the pawl tooth being retracted out of the path of the pins, the head is rotated at fast speed to bring the selected pin slightly in front of the position which will be occupied by the bearing face of the tooth when the pawl is shifted to its pin-engaging position. Next, the pawl is shifted to advance its tooth into the path of the pins to thereby bring the bearing face of the tooth to the mentioned position. Thereafter, the head is rotated to bring the selected pin into pressure contact with the bearing face of the pawl tooth. In these circumstances, the pawl acts as a stop for the head. Continuous torque is applied to the head to maintain the pressure contact between pin and tooth.

The head is thus held by the pawl at an angular position corresponding to the pin which has been selected to engage with the pawl tooth. Since the workpiece is coupled with the head through the arbor, the workpiece will be held in the same angular position.

While the workpiece is being so held, the gauging of the workpiece is carried out. After completion of this operation, the engagement between pawl tooth and pin is terminated, and the pawl is shifted to retract its tooth from the pin path to thereby permit the head to be indexed to a new angular position.

This positioning system has been entirely satisfactory in gauging apparatus wherein it is usually the case that the power required to position is small, the gauging takes place in a short time, and the positioning mechanism can be conveniently incorporated into the apparatus during the construction thereof.

The system of the patent is, however, characterized by certain disadvantages when it is attempted to utilize the same in the situation where the workpiece to be positioned is a workpiece on which a machining operation is being performed by the tool of a heavy machine, as, say, a heavy duty borer. Among such disadvantages are the following.

Frst, the system of the patent is inconvenient for use with a heavy machine tool since the system is designed as an integral part of the working apparatus in which employed, and hence cannot be incorporated into an already existing machine without effecting major constructional changes therein. Second, in the system, the pawl controls the power which positions the workpiece in the sense that the position selecting pin is urged against the pawl with the same torque which is used to move the workpiece when the pin and pawl are disengaged. Thus, in order to constrain the workpiece from rotation, the pawl exerts against the pin in engagement therewith an amount of counterforce which equals the force produced at the pin by the torque used to position the workpiece. Thus, if the system of the patent were used in a heavy machine tool where a large positioning force is required, and/or where the workpiece is subjected to large displacement forces by the tool operating thereon, an inordinate amount of counterforce would have to be exerted by the pawl in order to hold the workpiece steady. Third, in the disclosed system of the patent, the setting of the positioning mechanism and the operation performed on the workpiece take place in sequential relation. While not particularly undesirable in instances where the operation on the workpiece is a relatively fast gauging operation, the occurrence in sequence of the position setting and "working" operations is undesirable in a machine tool where the machining operation may be relatively lengthy, and where time could be saved by doubling up on the position setting and working operations.

It is accordingly, an object of the invention to provide a peg and pawl positioning system which may be used as an attachment for a machine tool, and which, when so used, requires the minimum amount of changes in the construction of the machine tool itself.

Another object of the invention is to provide a peg and pawl positioning system of the above character which is not required to hold the workpiece steady against the force of the machine.

A further object of the invention is to provide a peg and pawl positioning system wherein the setting of the system and the working operation of the machine may take place in parallel relation in the sense that the positioning system may be preset while the workpiece in the machine tool is being operated on.

These and other objects are realized according to the invention by providing a positioning mechanism which may be attached to a machine, and which comprises peg means and pawl means. One of these means determines primary or "digit" positions, while the other means determines secondary or "decimal" positions. One of the said means may be moved by the motivating force of the machine while the other is moved by an independent force, or both of the said means may be moved by the independent force. In either event, the force used to maintain the peg means and pawl means in contact is derived from a source different from the primary power source for the machine or apparatus, and is of substantially lesser value than the force used in the machine or apparatus to position the workpiece or to restrain the same from movement. Thus, the positioning system of the present invention is adapted to act as a "pilot" rather than as one of the agencies through which is transmitted the force by which the workpiece is positioned or maintained in position.

In consonance with its role as a pilot the positioning mechanism includes suitable means for controlling the power drive of the machine so that the workpiece will be moved by this power to the position established by the positioning mechanism. As a feature according to the invention, after the workpiece has been brought to a desired position, the workpiece may be clamped, and thereafter, one or both of the peg and pawl means may be uncoupled and preset to the next desired position while the workpiece is being operated on.

For a better understanding of the invention, reference is made to the following description of representative embodiments thereof, and to the accompanying drawings wherein.

Figure 5:
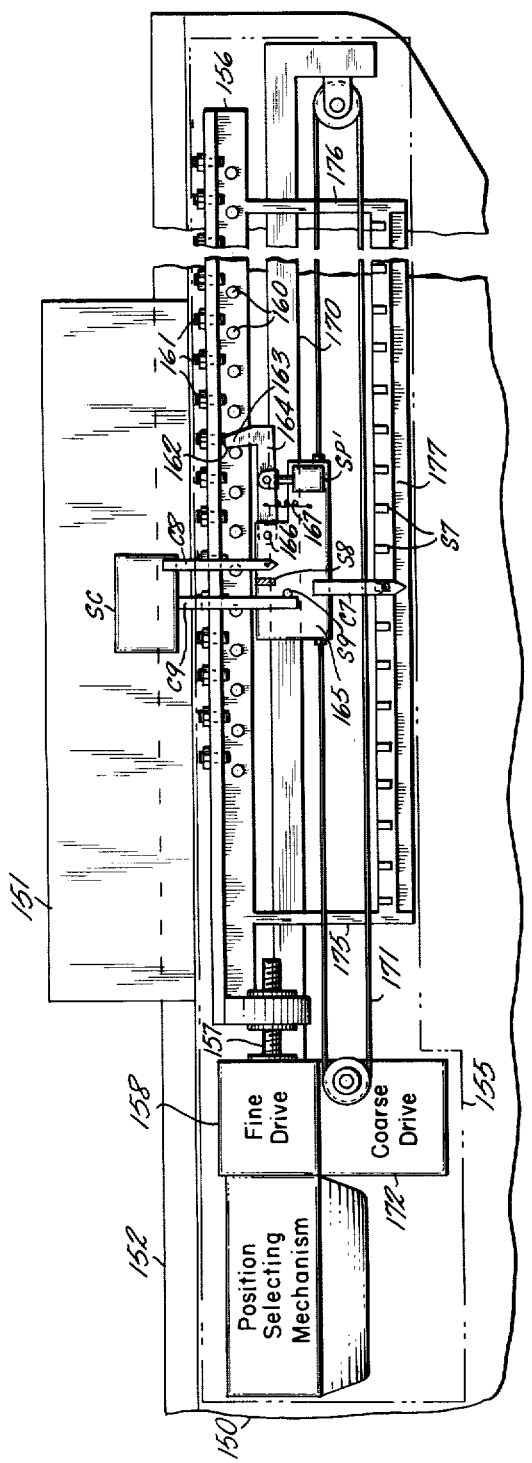
Fig. 5 is a plan view of mechanical details of another positioning system and of the machine tool to which this positioning system is attached.
Figure 6:
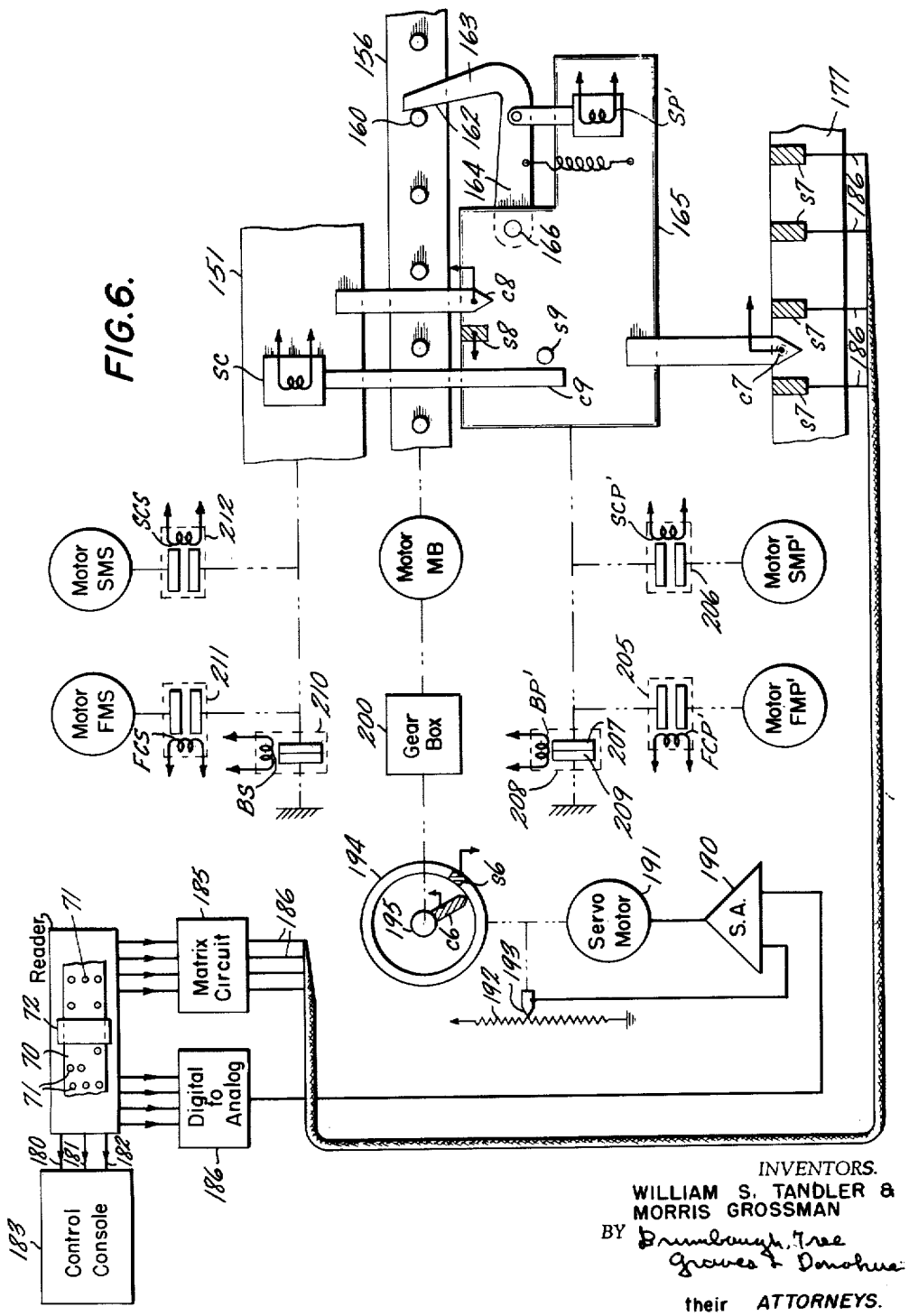
Figure 7:
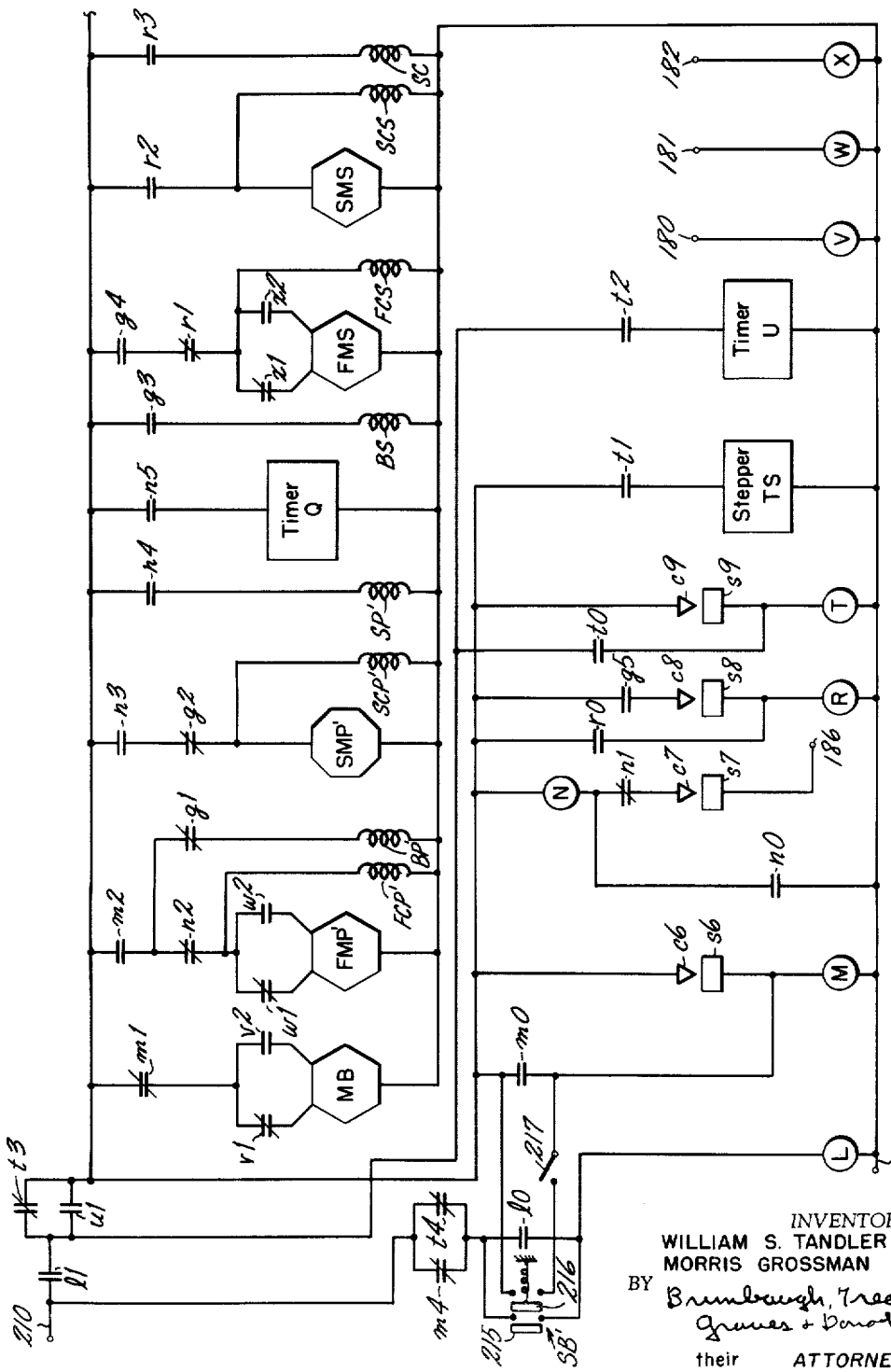

Fig. 6 is a schematic diagram of portions of the machine tool and position system shown in Fig. 5 and of additional means effective to control and otherwise operate the last named machine tool and positioning system; and Fig. 7 is a diagram of the electrical connections of relays and other components which may be used to perform control and other operational functions in relation to the organization of machine tool and positioning system shown in Fig. 6.

Figure 1:
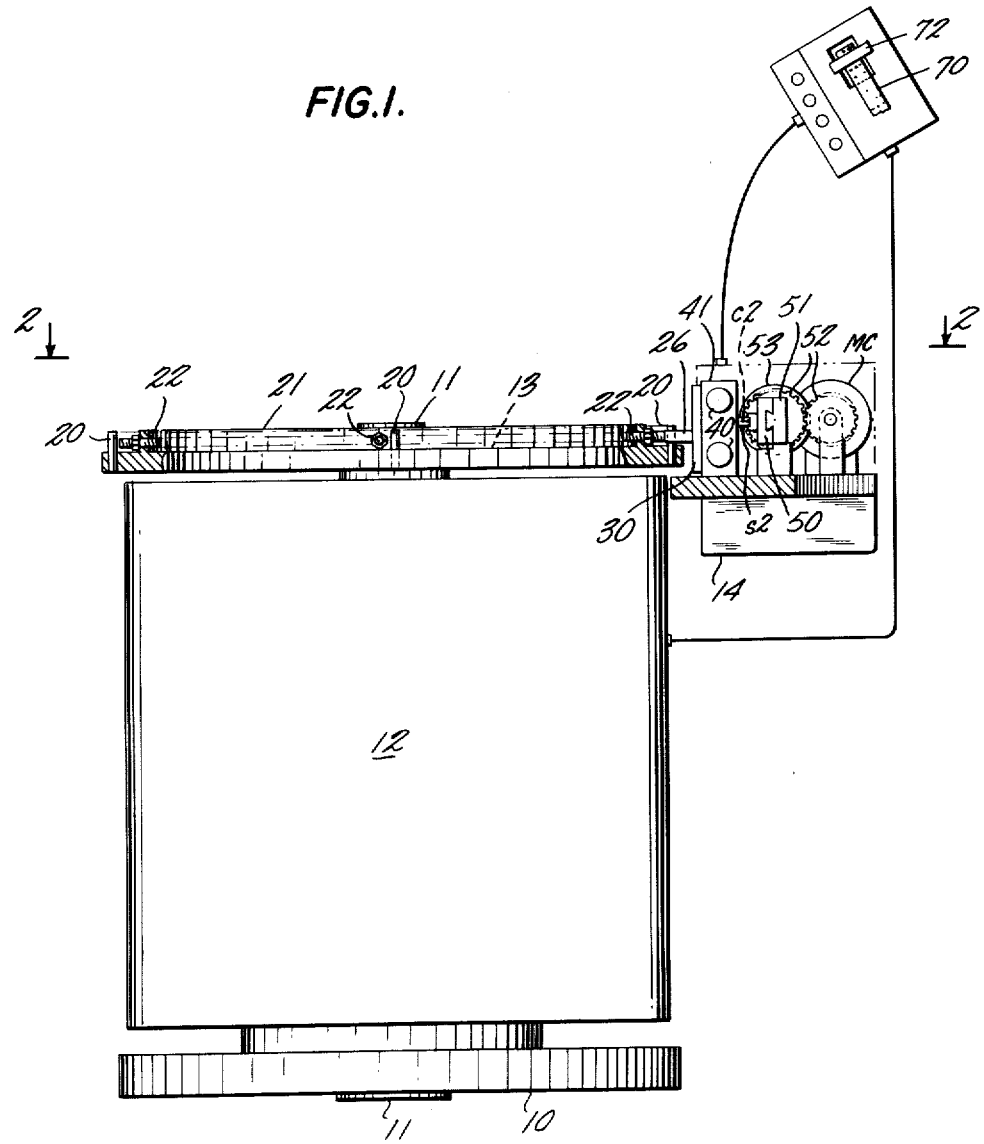
Fig. 1 is a plan view of a machine tool having attached thereto a positioning system in accordance with the present invention.

Referring now to Fig. 1, this figure shows in plan view the portion of a heavy duty machine tool, as, say, a borer, which is adapted to position a workpiece so that the same can be selectively machined or otherwise operated on by the tool (not shown) of the machine. In this positioning portion of the machine tool the workpiece (not shown) is carried by a worktable 10 fixedly mounted on an arbor 11 which extends through a housing 12 to project beyond the other end of the housing. At this other end of the housing there is attached to the machine tool a peg and pawl positioning system which is shown generally in Fig. 1 as consisting of a rotary head 13 mounted on the arbor, and of a frame 14 secured to the housing 12 and carrying the other components of the positioning system. The housing 12 includes the power source and motion transmission system (not shown in Fig. 1) which are part of the regular equipment of the machine tool, and by which the arbor 11 is moved to rotate the worktable 10 for purposes of positioning the workpiece carried thereby.

Figure 2:
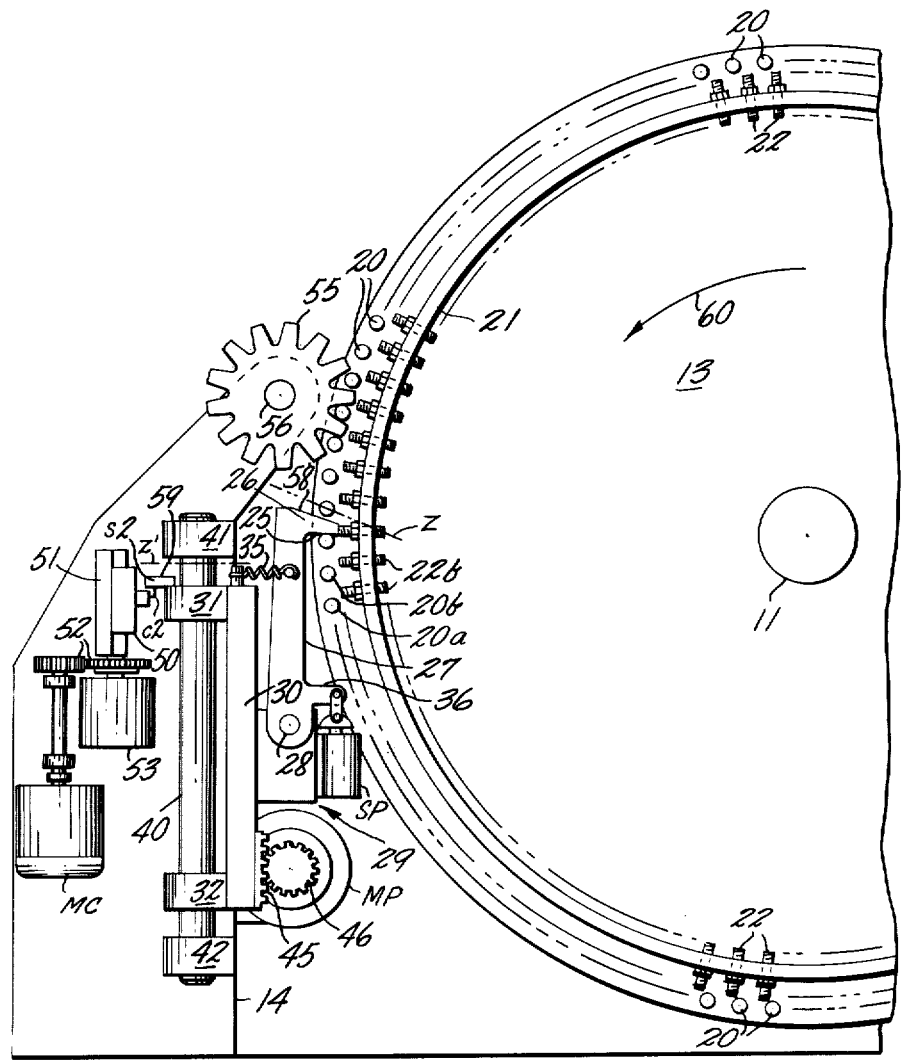
Fig. 2 is a front elevation, taken as indicated by the arrows 2—2 in Fig. 1, of mechanical details of the positioning system shown in Fig. 1.

Fig. 2 illustrates mechanical details of the peg and pawl positioning system. As shown in this figure, the rotary positioning head 13 is fixedly mounted on arbor 11 so that the head will be rotated by rotation of the arbor. The head carries a plurality of pegs in the form of pins 20 which are spaced apart by approximately equal angular intervals in a circular path near the periphery of the head. Radially inward of the path of the pins 20, the head 13 has formed therein a circular flange 21 which axially projects from the head. Received into threaded holes in the flange are a plurality of set screws 22 which, in the circumferential direction, are disposed intermediate the pins 20, and which project radially from the flange towards the path of the pins. One set screw is associated with each pin. The purpose of these set screws will be later described.

It will be understood that while, for convenience, only a few pins 20 and a few set screws 22 are shown, the pins and set screws continue around the entire circumference of the rotary head 13.

One of the pins 20 is shown as being in engagement with the bearing face 25 of the tooth 26 of a pawl 27 which is movable in angular position about a pivot pin 28 at the end of the pawl opposite the tooth. The pivot pin 28 is mounted on a block forming one component of a pawl carriage 29. Other components of the pawl carriage are a vertical plate 30 and slide blocks 31 and 32 mounted at the ends of the plate.

Ordinarily, the tooth 26 of pawl 27 is maintained retracted out of the path of pins 20 by the pulling action of a tension spring 35 which is attached at one end to the pawl carriage and at the other end to the pawl. However, the tooth of the pawl can be selectively advanced into the pawl of the pins against the urging of spring 35 by the energization of the winding of a solenoid SP whose armature is connected to the pawl 27 through the bell crank lever 36.

The pawl carriage 29 forms half of a slide of which the other half is provided by a pair of slide rods 40 which pass in close fitting relation through corresponding circular bores in the slide blocks 31 and 32 of the pawl carriage. Only one of the slide rods is shown in Fig. 2, the other slide rod being hidden behind the visible slide rod. The slide rods 40 are supported at their ends by a pair of mounting blocks 41, 42 which are secured at their bases to the frame 14 to project outwardly therefrom in the direction of the axis of the rotary head 13. The upper and lower mounting blocks 41 and 42 are adapted to act as respective stops for the upper and lower slide blocks 31 and 32 of the pawl carriage to thereby limit the travel of the pawl carriage.

The pawl carriage and pawl may be moved to different vertical positions by a three wire reversible pawl motor MP attached to the frame 14. The motor MP may be selectively coupled to or uncoupled from the pawl carriage by a motion transmission train which includes a rack 45 on the pawl carriage, a pinion 46 engaging the rack and an electromagnetic clutch CP (not shown in Fig. 2) interposed between the pinion 46 and the output of the motor. The pinion 46, is normally uncoupled from motor MP, but may be selectively coupled thereto by energizing the normally deenergized clutch CP.

The slide block 31 of the pawl carriage carries an electrically conductive anvil $s2$ which is mounted so as to be insulated from the slide block. The anvil $s2$ is adapted to be engaged by an electrically conductive probe $c2$ which is mounted on a probe carriage 50, but which is insulated therefrom. The probe carriage 50 is in the form of a movable block having a vertically running dovetail slot therein. Into this slot there is received a vertically running flange portion of dovetail cross-section of a statoinary block 51. The movable block 50 and stationary block 51 thus forms a dovetail slide. The probe carriage 50 may be vertically moved and positioned by virtue of a coupling thereof through a worm gear (not shown in Fig. 2) and a gear train 52 to a three wire reversible motor MC mounted on frame 14. As later explained in further detail, the setting in position of the probe carriage 50 is controlled by a position selecting mechanism generally shown in Fig. 2 by the unit 53.

Besides the components already described, the frame 14 carries a star gear 55 mounted on a shaft 56 and disposed with its teeth in meshing relation with the pins 20 on the rotary head 13. By virtue of this meshing relation, the star gear will be rotated by the pins as the head moves in angular position. The rotation of the star gear is imparted to the shaft 56 whose angular output is used, as later described, to control position setting operations. There are several advantages in providing such angular output by a star gear which meshes with the pins, and which is carried by the same frame as carries the pawl. Among such advantages are the following. First, if, as contemplated, the presently described peg and pawl system is to be attached to an already existing machine tool by mounting the head of the system on the arbor for the worktable of the machine and by mounting the frame for the pawl assembly on the frame of the machine to one side of the head, it is desirable to have the means providing the angular position-setting output carried by the same frame which carries the pawl assembly. Otherwise it would be necessary to provide an additional and separate mounting for the angular output means, and such additional mounting would add to the expense and inconvenience of attaching the peg and pawl system to the machine tool.

Second, in the described combination wherein an angular output which controls position setting is taken from the pins through a star gear carried by the same frame as the pawl, the position setting will, within a range of locations for the frame, be rendered substantially independent of the actual location of the frame relative to the rotary head in the direction tangential to the head. That this is so will be evident from the fact that, if the frame shifts tangentially by a slight amount to change slightly the position where the pawl engages the pins, the star gear, in response to this shift, will move through a small angle to thereby exactly compensate for the effect on position setting of the shift in the frame.

The described peg and pawl system provides accurate positioning in accordance with the following simplified explanation. The pawl has a reference or "zero" translational position which is assumed by the pawl when the top slanted surface of the pawl tooth 26 is in the position represented by the dot-dash line Z (Fig. 2). While the pawl is in this zero position, the top surface 59 of the anvil *s2* will coincide with the dot-dash line Z' of Fig. 2. This line Z' may, therefore, also be considered as marking the zero position of the pawl in terms of the top surface of the anvil.

As stated, the pins 20 are spaced around the head at angular intervals which are approximately equal. Thus, for example, there may be 360 pins separated by angular intervals of approximately 1°. For purposes of the present explanation, it will be assumed that there are 360 such pins. One of these pins, as, say, the pin 20a, is selected to represent 0° of angular displacement for the rotary head. The head will (to a close approximation) be in this position of 0° of angular displacement when the pin 20a contacts the bearing face 25 of the inwardly advanced pawl tooth 26 while the pawl is at its described "zero" position, i.e., when the top slanted surface 58 of the pawl tooth coincides with line Z and when the top surface 59 of anvil *s2* coincides with line Z'.

The head 13 may be rotated either counterclockwise or clockwise. The counterclockwise direction of rotation is shown in Fig. 2 by the arrow 60, and is considered to be the direction of forward movement of the head. The angular position of the head is measured in terms of the angular displacement thereof from its described position of zero angular displacement. For example, the head is said to have an angular position of 1.000° when the head is angularly displaced 1.000° from its zero position in the direction shown by arrow 60. Since the pins 20 on the head 13 are angularly spaced from each other by approximately 1°, it will be seen that the head 13 can be brought, at least approximately, to this 1.000° position by bringing into contact with the face 25 of pawl 27, while in zero position, the pin 20b which is displaced clockwise by approximately 1° from the pin 20a representing 0° displacement for the head.

The word "approximately" has been used hitherto, since, in building the head, it is not possible with ordinary machine shop methods to locate the pins on the head with the degree of precision to which it is desired to position the head by the described peg and pawl system. However, the inexactitude in the locations of the pins can be compensated for by proper adjustment of the set screws 22. This is so, since the bearing face 25 of the pawl is a planar face which is tilted at a slight angle to the radius of the head 13 which intercepts the center of the face 25, and since each set screw acts as a stop for the pawl tooth 26 to thereby determine what portion of the face 25 will contact the pin associated with that set screw when the tooth is stopped by the set screw. In other words, the bearing face 25 of the pawl can be considered to act as a wedge face which is selectively positionable in the radial direction of the head to give vernier control over the angular position of the head when one of the pins thereof is in engagement with the bearing face of the pawl. A further detailed explanation of this matter is given in the patent referred to at the beginning of this application.

From what has been said, it will be seen that by properly adjusting the set screw 22b which is associated with the pin 20b, the head 13 can be exactly brought to the position of 1.000° by bringing the pin 20b into contact with the face 25 of the pawl while in its zero translational position. In like manner, the head 13 can be brought to other angular positions having exact whole degree values, as, say, 5.000° or 289.000°, by bringing appropriate ones of the pins into contact with the face of the pawl while the pawl is in zero position. The pins, therefore, serve in the described peg and pawl system to determine the whole degree positions of the head.

Assume, however, that it is desired to bring the head to a position intermediate two whole degree positions, as, say, the position 3.535° which is located between the whole degree positions of 3.000° and 4.000°. The setting of the head to this intermediate position can be accomplished by first setting the head, as previously described, to the position of 3.000°, and by then rotating the head forward through the additional fraction of a whole degree of 0.535°.

In order, however, to position the head with this amount of accuracy, it is necessary to provide some means for determining positions of the head to the nearest 1/1000 of a whole degree. Such means is provided by the probe *c2*. This probe is set to represent a decimal angular position of 0.000° for the head when the probe just engages the bottom of the anvil *s2* at the time that the top of the anvil is in coincidence with the line Z'. In other words, the zero position for the probe corresponds to the zero position for the pawl.

By an appropriate amount of downward displacement of the probe carriage 50, the probe *c2* may be moved from its zero position through a range of displacements within which the probe can be set in position to represent an angular displacement for the head of any value from 0.001° to 0.999°. Thus, by selecting an appropriate position for the probe, it is possible to indicate within 1/1000 of a degree the decimal component of a desired angular position for the head, just as it is possible, by selecting an appropriate pin for engagement with the pawl, to indicate the whole degree component of a desired angular position for the head.

The decimal component of angular position for the head which is indicated by probe *c2* is translated into an indication of the same decimal component of angular position by the pawl at such time as the anvil *s2* on the pawl carriage is just in engagement with the probe *c2*. As an example, assume that probe *c2* has been set to indicate that the head is to have a decimal component of angular position of a value of 0.535° in addition to whatever whole degree component of angular position has been selected therefor. Assume, further, that the pawl is initially in its zero position, i.e., the pawl position for which the head will be set to an exactly whole number of angular degrees when any one of the pins thereof is brought into contact with the bearing face of the pawl. If now, the pawl carriage is moved downward to just bring the bottom of anvil $s2$ into contact with the probe $c2$, the pawl will move from its zero position in a direction corresponding to forward rotation of the head, and in an amount which corresponds exactly to 0.535° when translated into angular displacement of the head. With the pawl in this displaced position, when a pin, representing a desired whole degree component of angular position for the head, is brought into contact with the bearing face of the pawl, the head will be set both to the desired whole degree component and the desired decimal component of angular position. In the example described, where the desired whole degree component is 3°, the 3° pin will be brought into contact with the pawl face, the head thereafter will be exactly set to the desired angular position of 3.535°.

Figure 3:
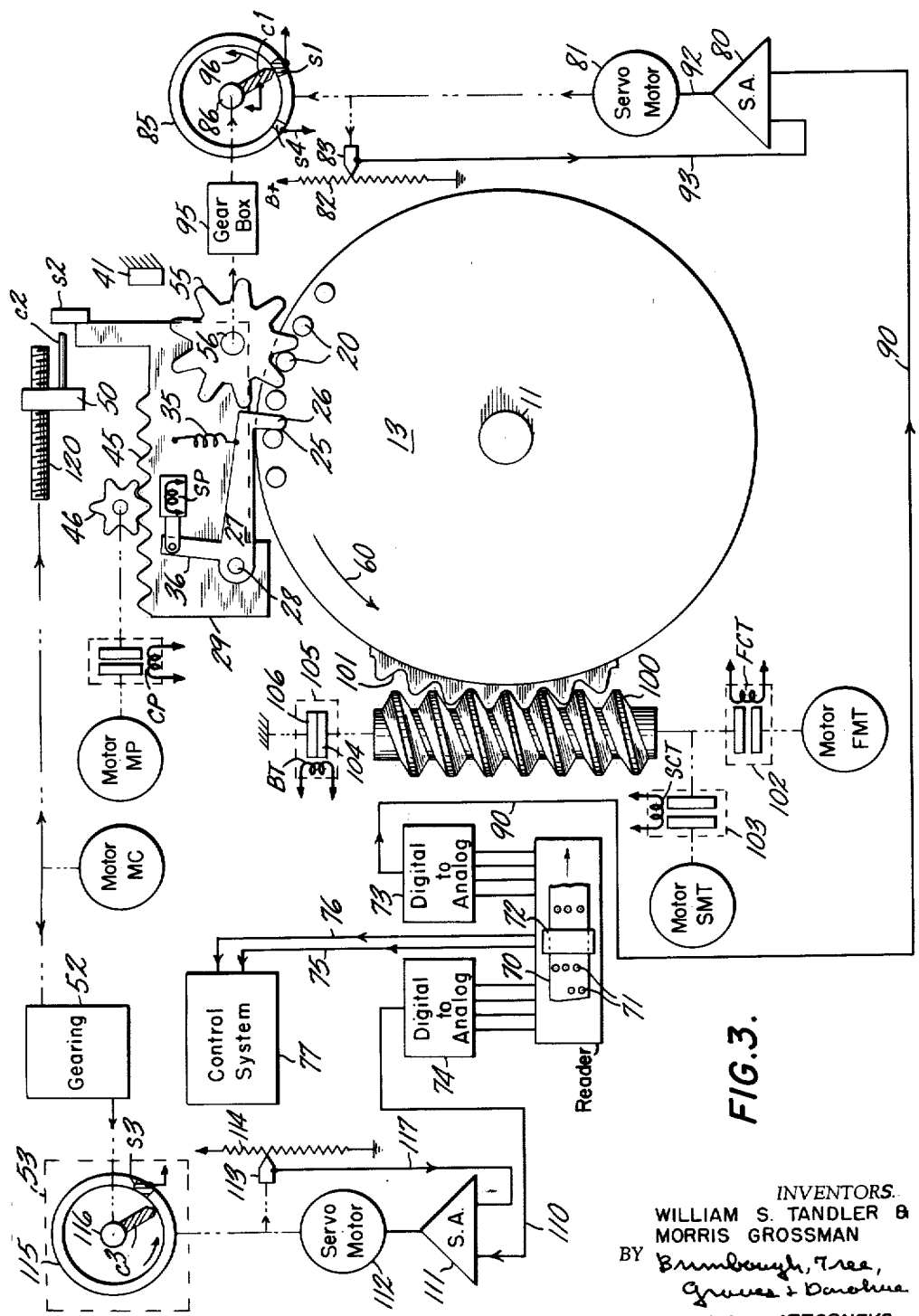
Fig. 3 is a schematic diagram of the machine tool of Fig. 1, the positioning system shown in Figs. 1 and 2, and the means whereby the machine tool and positioning system are controlled and operated.

The actual positioning of the rotary head 13 (and, thereby, of the workpiece on the worktable 10 shown in Fig. 1) is automatically accomplished by the system shown schematically in Fig. 3. Referring to this figure, the positions selected for the workpiece are indicated on a tape 70 by a series of codings 71 which are each constituted of a number of bi-valued indicia, as, say, indicia which are each in the form of an absence or presence of a perforation in the tape. Thus, each coding presents the information contained thereby as binary digit information. This information is subdivisible into information of the whole degree component of a selected angular position, information of the decimal degree component of the selected angular positon, and information indicating the direction of movement which parts of the peg and pawl system should take in order to bring the head to the angular position indicated by the coding.

The tape 70 is adapted to be intermittently advanced by a tape stepper TS (Fig. 4) so that the codings 71 on the tape are presented in succession to a tape reader 72. This device 72 reads out all the information contained in each coding 71 presented thereto. The part of this information representing the whole degree component of angular position is supplied in the form of electric signals to a digital-to-analog translator 73. The part of the binary digit information corresponding to the decimal degree component of angular position is supplied in the form of electric signals to a digital-to-analog translator 74. Two signals are supplied from the reader 72 over respective leads 75 and 76 to a control system 77 to be later described in further detail. The signal over lead 75 controls the direction of movement (forward or reverse) of the motor MC which drives the probe carriage 50, while the signal over lead 76 controls the direction of movement (forward or reverse) of the rotary head 13 during fast movement thereof.

The digital-to-analog translator 73 forms part of a position selecting mechanism of which other parts are represented in Fig. 3 by the servo amplifier 80, the servo motor 81, the potentiometer 82 and tap 83, and the combination of the annular ring 85 and the coaxial shaft 86 carrying the contactor $c1$ thereon. A complete explanation of this type of position selecting mechanism is given in our copending U.S. application Serial No. 605,279, filed August 21, 1956 now United States Patent No. 2,835,042, issued May 20, 1958. Hence, only a brief discussion of this sub-system will be given in the present application.

The described sub-system operates in the following manner. As described, translator 73 is supplied from the tape reader 72 with digital inputs representing the whole degree component of angular position indicated by a particular coding 71 on the tape 70. These digital inputs are converted by the translator 73 into an analog voltage signal, i.e., a signal having a voltage which varies in accordance with the value of the whole angle component of the angular degree position indicated for the head 13. This analog voltage signal is supplied by a lead 90 as one input to a servo amplifier 80. This servo amplifier develops on an output lead 92 an error signal output whose amplitude and polarity corresponds to the amplitude and polarity of the difference between the analog voltage signal on input lead 92 and the voltage which appears on tap 83, and which is fed from this tap by a lead 93 to another input of the servo amplifier 80. The voltage developed at tap 83 will vary in accordance with the position of this tap on the potentiometer 82 which is connected between a constant voltage source and ground. The tap 83 is set in position on potentiometer 82 by the servo motor 81 which rotates with a torque and direction which are determined, respectively, by the amplitude and polarity of the error signal supplied to the servo motor by the lead 92 from the servo amplifier 80. Thus, as so far described, the considered position selecting system is of the well known closed loop servo-system type wherein an analog voltage input develops an error signal, and wherein a tap is driven over a potentiometer until the tap reaches a position where the error signal has been reduced to zero value. When zero value for the error signal has been so attained, the system will be stabilized so long as the analog input signal does not change. In this stable condition for the system, the resting position of the tap on the potentiometer will be a measure of the value of the analog input signal.

From what has been said, it will be seen that the tap 83 is driven by the servo motor 81 to a resting position which, in general, is proportional to the whole degree component of angular position for the head 13 which is then being read out from a coding 71 on the tape. Now, in addition to driving the tap 83, the servo motor 81 is also coupled to rotate the annular ring 85 which is constituted of insulating material, but which carries the spaced electroconductive segments $s1$ and $s4$. At such time as the servo motor has driven the tap 83 to the point where the error signal has been reduced to zero, and the tap has accordingly assumed a rest position, the ring 85 will likewise have been driven by the servo motor 81 to assume a rest position wherein the angular location of the segment $s1$ is representative of the whole degree component of the angular position then selected for the head 13 by the coding which is being read out from the tape.

As has been previously mentioned, the shaft 56 of the star gear 55 provides an angular output for position control purposes. This angular output is transmitted through the gear box 95 to the shaft 86 which carries the brush contactor $c1$. Therefore, when the rotary head 13 is rotated, the motion of the head will be reflected in a rotation of the contactor $c1$. The coupling train between the head 13 and the contactor $c1$ is of such nature that the contactor will rotate in its forward direction represented by the arrow 96 when the head rotates in the forward direction therefor which is represented by the arrow 60. Furthermore, the angular phase relations between the head 13, the contactor $c1$ and the segment $s1$ are of such nature that, when rotating in the forward direction, the contactor $c1$ will reach the front edge of segment $s1$ at a time when the head 13 is in an angular position which is short by a small amount of the angular position selected therefor by the coding then being read out on the tape. As later described in further detail, the arrival of the contactor $c1$ at the front edge of segment $s1$ produces an electric signal which terminates the driving forward of the rotary head 13 at a fast rate. However, since the head has acquired a certain amount of angular momentum during its fast rotation, the head, after termination of the fast driving, will "coast" a little, and this slight coasting of the head will bring the head to almost exactly that angular position corresponding to the whole degree component of angular position which has been selected therefor by the tape coding.

It will be noted that the segment $s4$ is displaced by a few angular degrees from the segment $s1$ in the direction corresponding to reverse rotation for the head 13. When the head is moved from one position to the next by rotation in the forward direction and by an amount of more than 1°, the segment $s4$ is disabled and is of no effect. If, however, the head 13 is moved from one position to the next by reverse rotation (so as to, perhaps, take the shortest path between a previous position and the next selected position), the segment $s4$ is of effect in the following manner. As the contactor $c1$ reversely rotates, the segment $s1$ is disabled, and the segment $s4$ is enabled so that the contactor $c1$ first produces a signal upon coming into contact with the segment $s4$. This signal produced by contact of element $c1$ with segment $s4$ is utilized to change the rotation of head 13 from fast reverse to fast forward. Hence, the contactor $c1$ will rotate in the forward direction from segment $s4$ towards segment $s1$ until it contacts the front edge of this last named segment to produce the signal which terminates the fast forward rotation of the head. In this manner, whether the major movement of the head towards its next position is fast forward or fast reverse, any coasting of the head into position is done in the forward direction. This provision for coasting in one direction only is desirable for the reason that it enables the phase angle relations of the head 13, contactor $c1$ and segment $s1$ to be adjusted in such manner that the instantaneous angular position assumed by the head, when contactor $c1$ touches the front edge of segment $s1$, and the amount of forward coasting thereafter by the head will be additive to just bring the head to that position corresponding to the whole degree component of angular position indicated for the head. No such adjustment to allow for coasting could be made if the head might coast in either direction, since if such adjustment were made to allow for forward coasting, the adjustment would produce an error of double the amount of coasting in the instance where the coasting is in the reverse direction.

Sometimes, two successively indicated positions for the head will involve a movement from the first to the second position of less than one degree. In such instance, the head will not acquire its usual amount of angular momentum, and, accordingly, the head will not coast by the usual amount upon termination of the fast drive to the head. This lack of the usual amount of coasting may create the difficulty that the pawl will be blocked by a pin, i.e., cannot enter the path of the pins for the reason that, the pins are improperly positioned because they have not coasted by the amount which is normally expected of them. Hence, when it is desired to position the head by a movement which is of less than 1°, the head is positioned by the heretofore described procedure for fast reverse movement wherein fast reverse rotation is used to bring contactor $c1$ into contact with segment $s4$, and wherein fast forward movement is then used to bring the contactor $c1$ into contact with the front edge of segment $s1$.

The forward and reverse rotations of the head 13 are produced by rotation of the arbor 11 on which the head is mounted. As described, this arbor is part of the machine for which the described peg and pawl system is an attachment. Hence, the power drive used for the arbor with the peg and pawl system attached is the same power drive which was used in the machine for the arbor before attachment of the peg and pawl system. While this power drive may take various forms, it is shown in Fig. 3 as being in the form of a worm 100 meshing with a ring gear 101 which is secured to the arbor so that the arbor rotates when the ring gear is rotated. The worm 100 may be driven either by a fast speed motor FMT or by a slow speed motor SMT. The motor FMT may be selectively coupled to the worm 100 by the energization of the winding FCT of a normally uncoupled electromagnetic clutch 102 interposed between the motor FMT and the worm. Similarly, the motor SMT may be selectively coupled to the worm 100 by energization of the winding SCT of a normally uncoupled electromagnetic clutch 103 interposed between the motor SMT and the worm.

The worm 100 has also coupled thereto one brake plate 104 of an electromagnetic brake 105 having another brake plate 106 which is coupled to an immovable object such as the frame of the machine. When the winding BT of the brake 105 is deenergized, the brake plates 104 and 106 are in frictional contact to lock the worm 100 in place. This locking of the worm serves to clamp in place the workpiece carried by the worktable 10 (Fig. 1) on the arbor 11. However, as later described, the winding BT is energized at selected times to cause separation of the plates 104, 106 to thereby unlock the worm and to permit this element to be driven by the motor FMT or the motor SMT.

The motor FMT may be driven to give either fast forward or fast reverse rotation to the arbor 11, and thus to the head 13. The energization of this fast speed motor is terminated during fast forward rotation by the signal produced by contact of the contactor $c1$ with the segment $s1$. If motor FMT is initially energized to give fast reverse rotation, the direction of rotation is changed to forward when contactor $c1$ makes contact with segment $s4$. The ensuing fast forward rotation of motor FMT will be terminated when contactor $c1$ makes contact with segment $s1$.

The slow motor SMT is designed to drive the arbor 11 and the head 13 in only the forward direction. The energization of the slow speed motor is terminated by a signal produced when the anvil $s2$ contacts the probe $c2$. The time at which this last named signal is generated depends upon the setting in position of the probe $c2$, and this setting in position of the probe is, in turn, determined by a position selecting system which receives information from the tape reader 72 through the digital to analog translator 74. This position selecting system for the probe will now be discussed.

The translator 74 is supplied by the reader 72 with digital inputs representing the decimal degree component of the angular position for the head which is indicated by the tape coding 71 then being read out. These digital inputs are converted by the translator 74 into an analog signal which is supplied by lead 110 to the servo amplifier 111. The output of the servo amplifier drives the motor 112 to position a tap 113 on a potentiometer 114, and to also position a ring 115 which carries a segment $s3$, and which is rotatable about a shaft 116 carrying an electrical contacter $c3$. The voltage developed on tap 113 is supplied by lead 117 as another input to the servo amplifier 111. Thus, the presently described position selecting system has a mode of operation analogous to that of the previously described position selecting system receiving an input through the translator 73. Therefore, the ultimate effect of the reception of digital inputs by the translator 74 will be rotation of the annular ring 115 to a position where the location of the segment $s3$ is representative of the decimal degree component of the angular position indicated by the tape coding 71 then being read out.

The shaft 116 is coupled through the gearing 52 to the output of the reversible motor MC which moves the probe carriage 50 for the probe $c2$ through a motion transmission coupling. This coupling is schematically shown in Fig. 3 as consisting in part of the worm 120 received into a threaded hole in the carriage 50 whereby rotation of the worm produces translational displacement of the carriage. It follows that the angular displacement of the shaft 116, and of the contactor c3 thereon, will be a measure of the translational displacement of the probe c2. The displacement relations between the segments s3 on ring 115, the contactor c3 on shaft 116, and the probe c2 are chosen to be such that the contactor c3 will make contact with the segment s3 at that exact time that the motor MC has set the probe c2 to the position where the probe establishes for the rotary head 13 the particular decimal degree component of angular degree position which has been read out from the tape to cause the setting in angular position of the segment s3 by the servo motor 112. As later described in further detail, the coming into contact of contactor c3 with segment s3 produces an electric signal which terminates the energization of motor MC to thereby bring the probe c2 to rest in the position therefor which properly defines for the head 13 the indicated decimal degree component of angular position. Since the setting into position in this manner of the probe c2 takes place at a moderately slow rate, no allowance need be made for "coasting." Moreover, the probe may be properly set to position by rotation of the motor MC in either direction. In this connection, although, for convenience of illustration, the segment s3 has been shown in Fig. 3 as occupying a substantial angular interval around the ring 115. In practice, however, the segment takes up a very small angular interval of the ring. Therefore, the contactor c3 and the probe c2 will come to rest at the same position for a given setting of segment s3 whether the contactor c3 approaches the segment s3 either by forward or by reverse rotation of the contactor.

In addition to the components and cooperative relations already discussed, Fig. 3 also represents in schematic form various other cooperative relations, as, say, the cooperative relation between the probe c2 and the anvil s2. Also represented are the cooperative relations between the anvil s2, the probe carriage 29, the probe 27 with its tooth 26 and bearing face 25, and the pins 20 of the rotary head 13. It will be understood in connection with the schematic representation of Fig. 3, that this representation has been somewhat simplified for convenience of explanation, and that refinements may be made thereto in order to improve performance. For example, the position selecting servo-systems, to which the star gear 55 and the gearing 52 respectively feed their angular outputs, may take the form of servo-system which (as described in our mentioned co-pending application), provide position selection to both a coarse and a fine degree of accuracy rather than to the single degree of accuracy provided by the servo systems in Fig. 3. Also, to avoid any play in the position of the worktable 10 (Fig. 1) due to play between the ring gear 101 and the worm 100 during the time that the head is clamped in position by the locking action of the electromagnetic brake, this brake may be relocated to be directly coupled to the rotary head 13 or, preferably, the worktable 10, rather than being coupled to these elements through the worm 100.

Figure 4:
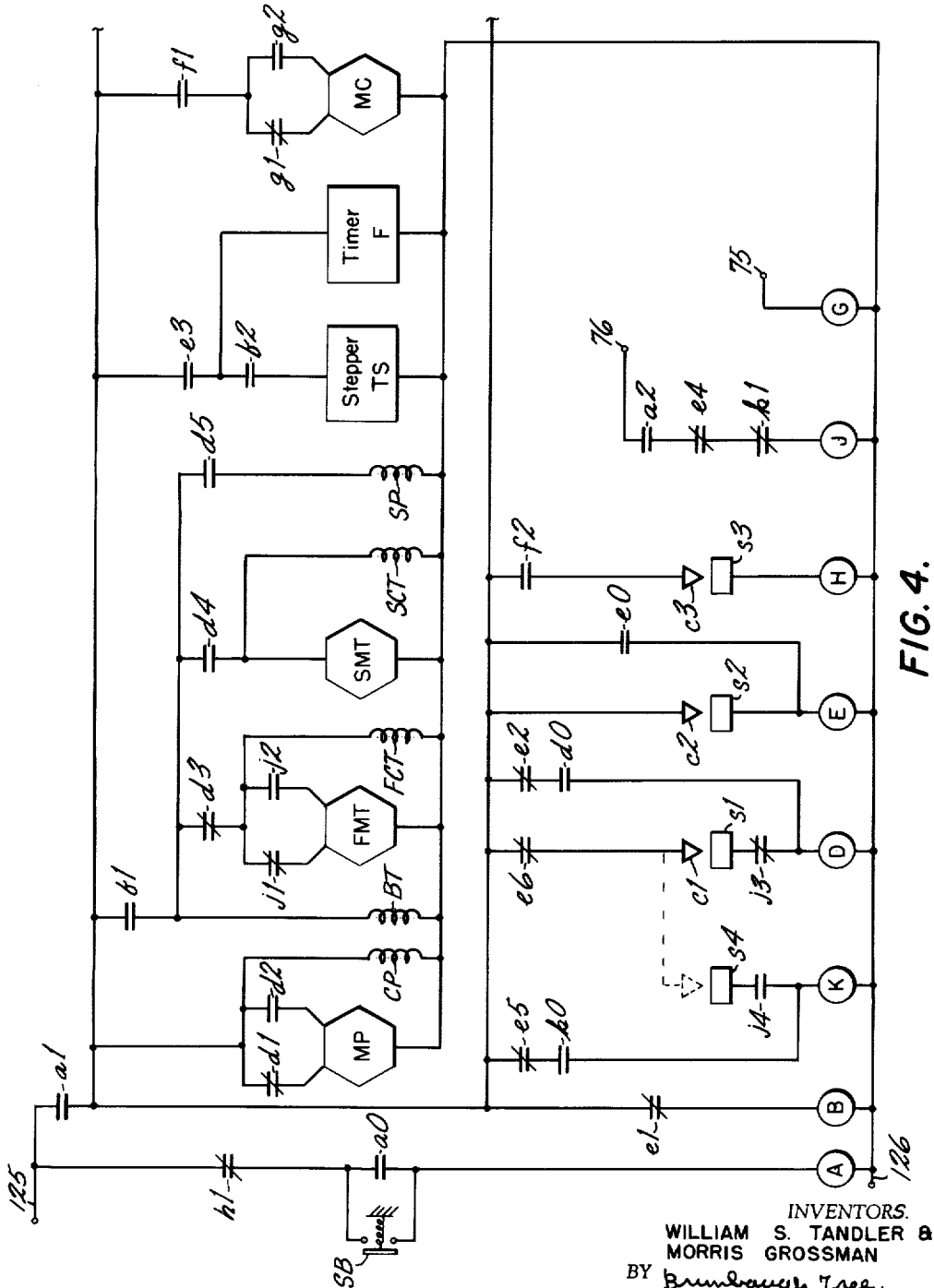
Fig. 4 is a diagram of the electrical connections of relays and other components which may be used to perform control and other operational functions in the organization shown by Fig. 3.

The various components of the organization shown in Fig. 3 are synchronized in their operation by a number of relays which are contained by the control system 77 shown in Fig. 3, and which are electrically connected in the manner shown by Fig. 4. A better understanding of the interrelations between the operation of the relays and the operation of the other components will be gained from the description, now to be given, of the overall operation of the system.

Figure 4 is an electrical circuit wherein most of the relays and other electrical components are shown as being energizable by connection between a pair of bus lines 125, 126. This diagram employs the convention that contacts shown as spring biased are biased by compression springs, and contacts which are normally closed and normally open are represented, respectively, by contacts having a diagonal line therethrough and contacts having no diagonal line therethrough.

Assume, to begin with, that the entire system is deenergized, that the head is at some position as, say, 289.724° to which it has been previously set, and that it is indicated by a coding 71 on tape 70 in the tape reader 72 that the next position to which the head is to be set is the position of 3.535°. Assume further that the probe c2 (Fig. 3) has been preset to represent 0.535°, the decimal degree component of the last named angular position, and that the segment s1 has been preset to represent the whole degrees component of the angular position indicated for the head.

Operation is initiated by pressing the start button SB (Fig. 4) to thereby energize the relay winding A. Winding A when energized closes the contacts a0 to thereby become self-holding. Also, the energization of winding A produces closure of the contacts a1 with the following effects.

First, the clutch CP becomes energized to couple the pawl carriage 29 (Fig. 3) to the motor MP. Moreover, the motor MP becomes energized through the normally closed contacts d1 so that the motor drives the pawl carriage towards the stop block 41 (Fig. 2) until the pawl carriage engages the block 41 to be stopped thereby. Thereafter, the motor MP continues to rotate, but slippage occurs in the clutch CP so that the pawl carriage is maintained in pressure contact with its stop.

As a second effect of the closure of contacts a1, this closure produces energization of a relay winding B. Winding B when energized closes the contacts b1. The closure of contacts b1 effects the following. The winding BT of the electromagnetic brake (Fig. 3) becomes energized to unlock the worm 100 so that this worm, the ring gear 101, the arbor 11 and the head 13 may be rotated. At the same time, the winding FCT of the electromagnetic clutch 102 becomes energized to couple the fast speed motor FMT to the worm. By the same closure of contacts b1, the fast motor FMT becomes energized through the normally closed contacts d3 and the normally closed contacts j1 to undergo "forward" rotation, i.e., rotation in the direction moving the rotary head 13 forward as indicated by the arrow 60.

At this juncture, the mechanical conditions in the system will be as follows. The probe c2 (Fig. 1) will have been preset in position so that the displacement of the probe from its zero position (i.e., the position where probe c2 contacts anvil s2 when the top of the anvil coincides with line Z') is a displacement corresponding to a forward angular displacement of rotary head 13 from an exact whole number of angular degrees in the amount of 0.535°, the decimal degree component of the indicated angular position for the head. The pawl carriage 29, when stopped by the stop block 41, will be a little advanced beyond the position of the pawl carriage representing zero position for the pawl. Accordingly, the top surface 58 of the tooth 26 of pawl 27 will be advanced slightly beyond the line Z. The pawl will be retracted by spring 35 so that its tooth 26 is out of the path of the pins 20 on the rotary head 13. The head will be moving in the forward direction indicated by arrow 60. This forward movement of the head will be causing the star gear 55 to rotate to thereby cause the contactor c1 (Fig. 3) to rotate in the direction shown by arrow 96 towards the segment s1.

The condition of affairs just described continues until the contactor c1 makes contact with the front edge of segment s1. The contact so made produces a signal which energizes the relay winding D (Fig. 4). The energization of this winding has the following effects. First, the winding D becomes self-holding through closure of the contacts d0. Second, the contacts d1 open and the contacts d2 close to reverse the movement of the motor MP for the pawl carriage. Third, the contacts d3 open to deenergize the clutch winding FCT, and, also, the fast motor FMT, to thereby terminate the fast speed drive for the worm 100. Fourth, the contacts $d4$ close to energize the winding SCT of the electromagnetic clutch 103 (Fig. 3) of the slow speed motor SMT, and, also, to energize this motor. Accordingly, the motor SMT now starts to drive the worm 100 to rotate the head 13 at slow speed in the direction indicated by arrow 60. Fifth, the contacts $d5$ close to energize the pawl solenoid SP to shift the pawl inwardly so that the tooth thereof is entered into the path of the pins.

As stated previously, the contactor $c1$ makes contact with the segment $s1$ somewhat in advance of the time when the rotary head would be brought under power by its fast forward rotation to that position corresponding to the exact whole number of angular degrees which is the whole angle degree component of the angular position indicated for the head. In other words, in the presently assumed instance, the contactor $c1$ would make contact with the segment $s1$ to energize relay winding D, and to thereby terminate the fast drive for the head 13, at a time shortly before the head reaches the 3° position. However, because of the angular momentum acquired thereby during the fast drive, the head will coast beyond the point at which the power for the fast drive is cut off, and this coasting will bring the head to a position which is short by a small fraction of a degree of the exact 3.000° position. By having the head so terminate its fast movement just short of an exact whole degree position, and by having the pawl at the time advanced slightly beyond its zero position, it is possible to bring the head by later slow movement to the indicated angular position therefor even when the decimal degree component for this angular position is 0.000°. After the head has ended its coasting, the tooth 26 of the pawl 27 will fly into the path of the pins so that the bearing face 25 of the tooth is positioned just above the 3° pin, and the reverse energization of the pawl motor MP will then bring the bearing face 25 into engagement with the 3° pin. The pawl motor MP provides low torque, and/or the clutch CP which couples this motor to the pawl carriage provides high slippage, so that the pawl is maintained in engagement with the 3° pin by a pressure contact which is of relatively low value. This means that, after the pawl has engaged the 3° pin, the pawl will move downward under the urging of the reversely energized motor MP only to the extent that this downward movement of the pawl is allowed by the 3° pin as the head 13 is rotated slowly forward by the slow speed motor SMT. These slow interlocked motions of the head and of the pawl will continue until the pawl carriage drops far enough so that the bottom of anvil $s2$ makes contact with the probe $c2$.

When the anvil $s2$ contacts probe $c2$ an electric signal is produced which (Fig. 4) energizes the relay winding E. The energization of winding E has the following effects.

First, the winding E becomes self-holding through the closure of the contacts $e0$. Second, the contacts $e1$ open to deenergize relay winding B to thereby open contacts $b1$. When contacts $b1$ open, the clutch winding SCT is deenergized to uncouple slow speed motor SMT from the worm 100 and this slow speed motor is deenergized at approximately the same time. Also, the pawl solenoid SP is deenergized, whereby the pawl tooth 26 is again retracted from the path of the pins 20 by the urging of tension spring 35. Also, the winding BT of the electromagnetic brake is deenergized whereby the worm 100 becomes locked in position by the brake. When so locked in position, the worm 100 serves to clamp in place the head 13, and, also, the worktable 10 (Fig. 1) which carries the workpiece.

As a further effect of the energization of relay winding E, the contacts $e2$ open to thereby open the self-holding path for relay winding D to thereby cause deenergization of this last named winding. Upon deenergization of winding D, the contacts $d1$ close, and the contacts $d2$ open so that the pawl motor MP is again energized to drive the pawl carriage upward to the position where it is stopped by block 41.

As a result of the actions just described, the rotary head 13 will have been brought to exactly the angular position selected therefor by the coding on the tape. In other words, in the presently assumed instance, the head 13 will have been brought exactly to the position of 3.535°. Having been brought exactly to this desired angular position, the head will be locked in place by the deenergization of the winding BT of the electromagnetic brake. Since the head and worktable are coupled through arbor 11, the worktable 10 (Fig. 1) with the workpiece thereon will likewise have been brought to exactly the desired position, and will likewise be locked at this position. While the worktable and workpiece are being so held in the selected angular position, the machining operation intended for that position is carried out on the workpiece.

While this machining operation is taking place, the probe $c2$ is preset in the following manner to the next decimal component of angular position indicated for the head 13, the worktable and the workpiece. In addition to the effects previously described as following on the energization of relay winding E, this relay winding closes a pair of contacts $e3$ to energize a self-resetting timer F and to also energize the stepper TS through contacts $e3$ and $b2$. This energization of stepper TS lasts only for a momentary interval which ends when contacts $b2$ open in response to the deenergization of relay winding B by the opening of contacts $e1$. During this momentary interval, a pulse of current passes through the stepper, and the stepper is operated by this current pulse to advance a new coding 71 on the tape 70 into the tape reader 72. In response to this new coding presented to the tape reader, the segment $s1$ is reset to represent the whole angular degrees of the new angular position indicated by the new coding. Likewise, the segment $s3$ is reset to represent the decimal degree component of the indicated new angular position.

The timer F provides a time delay sufficient to assure that both the segment $s1$ and the segment $s3$ have been fully set to their new positions. After this time delay, the energized timer F closes the contacts $f1$ to thereby energize the probe motor MC. If the probe $c2$ has to be given a "forward" movement in order to travel from its previous position to the new position now indicated for it, then the probe motor MC is energized through the normally closed contacts $g1$ to impart this forward movement to the probe. If, on the other hand, the probe $c2$ must move reversely in traveling from its previous position to its new position, this fact is indicated by a signal from the tape reader 72 which appears on the lead 75, and which causes energization of the relay winding G to thereby cause opening of the contacts $g1$ and closing of the contacts $g2$. In these latter circumstances, the probe motor MC will be energized through contacts $g2$ rather than contacts $g1$, and the motor will move the probe in the reverse direction as required.

Whether the motor MC is energized for forward or reverse rotation, the motor MC will produce movement both of the probe $c2$ and of the contactor $c3$ until the instant that the contactor $c3$ comes into contact with the segment $s3$ which has been set to the new position. When contactor $c3$ so makes contact with segment $s3$ a relay winding H (Fig. 4) is momentarily energized. The energization of the winding H causes the opening of a pair of contacts $h1$ in the self-holding path for relay winding A. The ensuing deenergization of winding A results in the opening of the contacts $a1$. When contacts $a1$ so open, the entire system is deenergized, and will remain deenergized until the start button SB is again pushed.

So far, there has been considered the instance where the head 13, in order to be brought from a previous position to its next position, is given a fast forward rotation. It is often the case, however, that it is desirable to move the head by fast reverse rotation from its previous position to its next position, since this reverse rotation enables the head to travel by the shortest path to the new position.

If fast reverse rotation is to be used in positioning the head, this fact is indicated by a signal which is read out from the tape, and which is supplied from the tape reader 72 over the lead 76 to a circuit for a relay winding J. When, as before described, the start button SB is pushed to energize relay winding A, this winding closes a pair of contacts $a2$ in the circuit for winding J to thereupon energizing winding J.

Winding J, when energized, has the following effects. First, the energized winding opens the contacts $j1$ and closes the contacts $j2$ so that the fast speed motor FMT will run reversely to drive the head 13 at fast speed in the reverse direction of rotation. Second, the contacts $j3$ are opened to thereby open the circuit for segment $s1$ so that this segment cannot now cause energization of the winding D if the contactor $c1$ happens to brush across the segment $s1$. Third, the contacts $j4$ are closed to render the segment $s4$ operable to energize the relay winding K at such time as the contactor $c1$ makes contact with segment $s4$.

With these actions having been carried out by the energization of relay winding J, the head 13 and the contactor $c1$ are rotated at fast speed in the directions opposite to those shown by arrows 60 and 96, respectively, until the contactor $c1$ makes contact with the segment $s4$. When this event happens, relay winding K becomes energized with the following effects. First, by closing the contact $k0$, the winding K becomes self-holding. Second, the contacts $k1$ are opened to thereby deenergize winding J. When winding J is so deenergized, the conditions established in the relay circuit are the same as those present while the head is being moved by fast forward rotation towards its new position. In other words, after contactor $c1$ has engaged segment $s4$, the direction of rotation of the head 13 and of the contactor will be changed to the forward direction, and movement in this forward direction will continue at fast speed until contactor $c1$ makes contact with the front edge of segment $s1$. From this point on, the sequence of events will be exactly the same as the sequence heretofore described for the instance where the initial movement of the head is fast forward movement.

As mentioned previously, sometimes it is necessary to move the head from one position to the next by an angular interval of less than 1°. For such small movements, the difficulty may be created that, because the head fails to coast by the usual amount, the head comes to rest in a position where the entrance of the tooth 26 of the pawl 27 into the path of the pin is blocked by one of the pins. This difficulty is taken care of by coding the tape to impress the signal calling for fast reverse movement on the lead 76 in every instance where a movement of less than 1° is involved, whether the angular displacement of the head from its previous position to its new position lies in the forward direction or in the reverse direction of rotation of the head. By so coding the tape, in those instances where the displacement between two successive positions is less than 1°, the head 13 will reach the new position by a fast reverse rotation until contactor $c1$ makes contact with segment $s4$, and by fast forward rotation until contactor $c1$ makes contact with the front edge of segment $s1$. In this way, the amount of coasting produced will be the same in the instance where the actual displacement between successive positions is less than one degree as in instances where the angular displacement of the head between successive positions amounts to several degrees. Hence, it can be assured that the coasting of the head will always bring the pins thereof into proper position, relative to the pawl, no matter how large or small the actual angular displacement between a position previously assumed by the head and the position next to be assumed by the head.

There are shown in Fig. 4 a number of relay contacts which have not yet been described. These relay contacts serve the purpose of disabling the circuits in which they appear so that the circuits cannot be energized at the wrong times in the operation sequence to thereby introduce a spurious action into the sequence. Since the mentioned contacts are merely disabling contacts which play no part in a positive sense in the operation of the system, the mentioned disabling contacts will not be described in any further detail.

The described rotary peg and pawl system is characterized by a number of advantages among which are the following. First, the peg and pawl positioning system may be conveniently attached to a machine without requiring major constructional changes therein, since no part of the peg and pawl system is in the train of elements by which motion is transmitted from the power drive of the machine to the worktable thereof. Second, although the described peg and pawl system does not enter into the coupling train by which motion is transmitted from the power drive of the machine to the worktable of the same, nonetheless the peg and pawl system is adapted by the closure of electric contact elements to provide electric signals controlling the energization of the power drive for the machine. Therefore, the peg and pawl system enables the worktable to be positioned by the same power drive as was previously used for this purpose, but with a much greater degree of accuracy than was previously possible. Third, since it is not required of the pawl to constrain the head from rotation under the urging of the power torque which is used to position the worktable and workpiece, the means used to maintain the pawl in pressure engagement with a pin on the head may be a low torque or low force means which is separate from the power drive of the machine. Likewise, the source which motivates the probe carriage may be a low torque or low force source. The low value of force, torque, pressure or the like exerted by these sources enables the parts of the peg and pawl system to be of correspondingly delicate construction to thereby provide correspondingly greater precision in the selection of position.

In connection with the above, it is to be noted that, instead of the head following the position of the pawl, the pawl is constrained by the pin engaged thereby from moving under the urging of the force exerted by the low torque motor. In other words, the pawl is caused to follow the head. The pawl, therefore, acts as an instrument which senses the head position rather than an instrument which maintains the head at a particular position. The function of maintaining the head (and, also, the worktable and workpiece) at a selected position is taken over by a clamping means such as, say, the described electromagnetic brake. The use of such clamping means, rather than the pawl, to maintain the worktable in position permits parts of the peg and pawl system to be released from this previous position selecting condition, and to be preset to a condition indicating a new position selection during the time that a machining operation is being carried out on the workpiece. This is a fourth advantage of the described peg and pawl system.

As a fifth advantage, the described system is capable of proceeding from one position to the next by fast movement in either the forward or the reverse direction. The system is thereby enabled in every instance to travel by way of the shortest path to the new position. At the same time, the same degree of reliability in positioning is obtained whether the initial fast movement is forward or reverse. This reliability of positioning is assured by the fact that, whether the initial fast movement is forward or reverse, the termination of the fast movement is always in the same direction due to the "overshoot and return" feature which is employed when the initial movement is fast reverse rather than fast forward.

The advantages just described are not limited to a rotary peg and pawl system. Some of the same advantages may be found also in a peg and pawl positioning system which is "linear" in the sense that it determines translational positions rather than angular positions. The mechanical details of a linear peg and pawl system of this sort are shown in Fig. 5 which will now be considered.

Referring to Fig. 5, the numeral 150 designates the frame of a machine having a slide or worktable 151 which is adapted to carry a workpiece. The slide 151 is movable back and forth along the slide way 152 to thereby bring the workpiece to different positions of translational displacement.

Mounted on the machine frame 150 is a subframe 155 for the linear peg and pawl system. The peg and pawl system may thus be in the nature of an attachment for the machine. As shown in the figure, the system includes a peg bar 156 attached to a worm 157 which is rotatable by a fine driving unit 158 to thereby position the peg bar with great accuracy in the direction of movement of the machine slide 151. The peg bar carries a set of longitudinally spaced pins 160 and, also, a number of set screws 161. One set screw is associated with each pin. These pins and set screws are analogous in structure and function with the pins and set screws already described in the rotary peg and pawl system.

The pins 160 are adapted to be individually engaged by the slanted bearing face 162 of the tooth 163 of a pawl 164. The pawl 164 is hinged to a pawl carriage 165 by a pivot pin 166 so that the pawl may be angularly moved either to enter its tooth between two pins 160, or to retract its tooth from the path of the pins. Normally, the pawl 164 is maintained in the position where the tooth is retracted from the pin path by a tension spring 167 having one end anchored to the pawl and the other end anchored to the pawl carriage. However, the pawl may be moved against the urging of this spring to enter the tooth between adjacent pins 160 by the energization of a pawl solenoid SP' which is mounted on the pawl carriage, and which has its armature connected to the pawl.

The pawl carriage 165 is mounted on a slide bar 170 to be translationally movable back and forth in the direction of movement of the peg bar 156 and of the machine slide 151. Motion is imparted to the pawl carriage by a continuous belt 171 which is driven by a coarse drive unit 172.

For the purpose of positioning the pawl carriage, the peg bar carries by struts 175 and 176 an electrical segment bar 177. This bar is comprised of insulating material but carries a number of electroconductive segments *s*7 spaced at equal longitudinal intervals along the bar. An electrical contactor *c*7 on the pawl carriage 165 is adapted to electrically connect with the segments, one at a time, as the pawl carriage moves relative to the bar 177.

The pawl carriage, in addition to carrying the contactor *c*7 also carries an electroconductive segment *s*8 and an actuating pin *s*9. Both the segment *s*8 and the pin *s*9 are electrically insulated from the pawl carriage. The segment *s*8 is adapted to be electrically contacted by a contactor *c*8 carried by the machine slide 151. The pin *s*9 is adapted to be electrically contacted by a retractable actuating finger *c*9, also carried by the machine slide 151. Normally, the finger *c*9 is maintained in retracted position so that the finger will clear the pin *s*9 as the slide 151 moves past the pawl carriage in either direction. However, at a selected time, the actuating finger *c*9 may be advanced outwardly by the energization of a solenoid SC so that the finger will engage the pin.

In the described linear peg and pawl system, the peg bar 156 has a zero position towards the leftward end of its range of movement. The pins 160 on the peg bar are longitudinally spaced from each other by approximately equal intervals which each represent one whole unit of translational displacement for the machine slide 151. Thus, for example, the pins 160 may be mutually spaced by intervals which approximate 1.000 inch. The positional relations between the machine slide 151, the actuating finger *c*9, the actuating pin *s*9, the bearing face 162 of the pawl, and the portions of the pins 160 adapted to engage this face are chosen to have such quantitative values that, while the peg bar 156 is in zero position, the pawl is engaged under proper pressure contact with a particular pin, and the pawl is properly seated against the adjustable set screw associated with that particular pin, the machine slide 151 will be displaced from some reference datum by the exact whole number of units of displacement represented by that particular pin. For example, if, a particular pin represents 6.000 units of displacement of the machine slide 151 from a reference datum, the machine slide will have this displacement from the reference datum when the face 162 of the pawl 164 engages the 6.000 units pin while the tooth of the pawl is properly seated against the adjustable set screw associated with the 6.000 units pin, also, and while the peg bar 156 is in its zero position, and the finger *c*9 of the machine slide is in contact with the actuating pin *s*9 of the pawl carriage.

Assume, now, that it is desired to position the machine slide 151 not to a position expressed by an exact whole number of displacement units, as, say, 1.000 inch or 2.000 inches, but, instead, to a position which is expressed as an exact whole number of displacement units plus an additional fraction of one whole displacement unit. Such last named position might be, for example, a position of 1.274 inches. The decimal component of the desired position is obtained by rotating the worm 157 in a proper amount so that the peg bar 156 and the pin 160 thereon are displaced from the zero position of the peg bar in the rightward direction by the amount of 0.274 inch. If a rightward displacement of the peg bar in this amount has been made, and if, thereafter, the pawl 164 properly engages with the pin representing 1.000 units, and the finger *c*9 is then brought into contact with the pin *s*9, the machine slide 151 will be exactly positioned to the desired position of 1.274 inches relative to the reference datum.

From what has been said, it will be seen that in the linear peg and pawl system it is the movement from a zero position of the pin carrying member which is used to provide a measure of the decimal component of position, and that it is the movement of the pawl which is used to provide a measure of the whole number component of position. This is the converse of the situation obtaining in the rotary peg and pawl system where the movement of the pawl from zero position is used to provide a measure of the decimal component of the desired position, and where the movement of the pin carrying member is used to provide a measure of the whole number component of the desired position.

In addition to the positional relations heretofore described, there is a significant positional relationship between the pins 160 on the peg bar 156 and the various segments *s*7 on the segment bar 177. This relationship is as follows. Each of the segments *s*7 corresponds to one of the pins 160 on the peg bar. In any one positioning operation, the particular pin to be engaged by the pawl is indicated by connecting in circuit only that particular segment *s*7 which corresponds to the pin to be engaged. The connection in circuit of this particular segment *s*7 results in the production of an electric signal at the time when the contactor *c*7 passes over the selected segment in the course of movement of the pawl carriage 165 relative to the peg bar 156 and the segment bar 177. At the time this signal occurs, contactor *c*7 will have a fixed positional relation with the pin selected to be engaged, since the selected pin and its associated selected segment $s7$ are in fixed positional relation by virtue of the coupling together of peg bar 156 and segment bar 177 through the struts 175, 176.

Now the positional relations of the segments $s7$, the contactor $c7$, the pawl 164 and the pins 160 are so chosen that, at the instant the electric signal is produced by the passing of the contactor $c7$ over the selected segment $s7$, the pawl will be positioned relative to the pin to be engaged thereby so that the pawl will be prepared to enter, with adequate clearance between the pin to be engaged and the next pin to the right. No allowance need be made, in this instance, for the different effects, on the positioning of the pawl relative to the selected pin, of the "coasting" of the pawl carriage when moving forward, and when moving reverse. This is so, since, the pawl carriage, being of relatively small mass, will undergo only a negligible amount of coasting. Also, no mispositioning of the pawl relative to the selected pin can be caused by the decimal positioning of the peg bar. The reason for this is that, by virtue of the coupling between the segment bar 177 and the peg bar 156, the segments $s7$ will receive whatever longitudinal movement is imparted to the pins 160 as a result of decimal positioning of the peg bar 156 by the worm 157. Hence, the segments $s7$ can never become misaligned with the pins 160. It follows that, at the time the pawl is ready to enter its tooth into the path of the pins, the pawl will always be properly located to do so. In other words, the situation will not arise where the pawl is improperly located relative to the selected pin so that this pin (or any other) will block entrance of the tooth of the pawl into the pin path.

The power drives and other components for controlling the positions of the machine slide 151, peg bar 156 and pawl carriage 165 are shown in schematic form in Fig. 6. Referring to this last named figure, as before, the information necessary to move the machine slide to successively desired positions is contained by successive codings 71 on a tape 70 which is intermittently advanced by the tape stepper TS (Fig. 7) to present each coding in turn to the tape reader 72. Each coding 71 provides binary digit information representing a particular translational position desired for the machine slide. Each coding also provides binary digit information indicating the directions of movement to be taken by, respectively, the peg bar, the pawl carriage, and the machine slide in the course of bringing the slide from its previous position to the position indicated by the coding. This last named information is supplied from the reader 72 as respective electric signals over the leads 180, 181, 182 to the control console 183.

The information representing the desired translational position for the slide is subdivided into information representing a whole units component of position and a decimal unit component of position. The information representing the whole units component is supplied as digital inputs to a matrix circuit 185. The information representing the decimal unit component is supplied as digital inputs to a digital-to-analog converter 186.

The matrix circuit 185 is of the conventional type wherein there are a plurality of outputs respectively corresponding to the different combinations of digital inputs which may be supplied to the circuit, and wherein each particular combination of digital inputs selectively actuates only the one output corresponding to this particular digital input combination. In the present instance, the number of outputs of the matrix circuit 185 corresponds to the number of electroconductive segments $s7$ on the segment bar 177, and the several outputs of the circuit are respectively connected to the segments $s7$ by the leads 186. The mode of connection is such that each digital input combination, representing a particular value for the whole units component of the desired position, will cause selective actuation of only that segment $s7$ which will serve to render the pawl engaged with the pin representing that whole units component value when the sequence of operation for the positioning system is carried out. Thus, for example, if a particular digital input combination to the matrix circuit 185 is representative of a whole unit of displacement component of 2.000 inches, this 2.000 digital input combination will cause selective energization of the segment $s7$ which will render the pawl engaged with the 2 units pin.

As stated, that information from the tape reader 72, which represents the decimal unit component of the desired position for the slide, is supplied in the form of digital inputs to the digital-to-analog converter 186. This digital-to-analog converter forms part of a position selecting mechanism which includes as other components the servo amplifier 190, the servo motor 191, the potentiometer 192 with the tap 193 thereon, and the annular ring 194 which carries the electroconductive segment $s6$, and which is rotatable about the shaft 195 mounting the contactor $c6$. This position selecting mechanism of Fig. 6 operates in exactly the same manner as the similar position selecting mechanisms previously described in connection with Fig. 3. Hence, the effect of the considered position selecting mechanism of Fig. 6 will be to rotate the ring 194 until the segment $s6$ is set to an angular position which is representative of the decimal unit component of the desired position for the machine slide.

In the position selecting mechanism, of Fig. 6, the shaft 195 is coupled to receive, through a gear box 200, the output of a reversible three wire motor MB which through the worm 157 (Fig. 5) serves to impart translational displacements to the peg bar 156. Thus, the shaft 195 is, in effect, coupled with a peg bar 156 in such a manner that any translational displacement imparted to the peg bar will be reflected in a proportional angular displacement of the shaft 195. At some time in this angular rotation the contactor $c6$ on the shaft 195 will make contact with the segment $s6$ on the ring 194. The angular phase relations between the contactor $c6$ and the segment $s6$ are chosen to be such that contact will be made between these two elements at exactly the time that the peg bar is displaced from its zero position in an amount corresponding to the decimal unit component of the desired position for the slide which is represented by the setting at that time of the segment $s6$. The making of contact between the contactor $c6$ and the segment $s6$ produces an electric signal which is used to terminate the translational movement of the peg bar.

In this connection, in practice, the segment $s6$ occupies a very small angular interval of the ring 194. Hence, at the time of making of contact between elements $c6$ and $s6$, the peg bar 156 will be in substantially the same position, whether this making of contact is produced by a clockwise or a counterclockwise approach of the contactor $c6$ towards the segment $s6$.

The pawl carriage 165 may be driven at fast speed in either the leftward or the rightward direction by a fast three wire reversible motor FMP' when this motor is coupled to the pawl carriage by the energization of winding FCP' of an electromagnetic clutch 205 disposed in the motion transmission coupling between the motor FMP' and the carriage. The pawl carriage 165 may also be driven at slow speed in the leftward direction by a slow speed motor SMP' when this last named motor is coupled to the pawl carriage by the energization of the winding SCP' of an electromagnetic clutch 206 disposed between the motor SMP' and the pawl carriage. Besides being coupleable to the mentioned motors, the pawl carriage 165 is coupled to one brake plate 207 of an electromagnetic brake 208 having an energizing winding BP', and having another brake plate 209 which is coupled to an immovable object, as, say, the frame 155 for the linear peg and pawl system. When the winding BP' of the electromagnetic brake is deenergized, the plates 207, 209 of the brake are maintained in frictional contact to thereby lock the pawl carriage 165 in position. However, at a selected time in the sequence of operation, the winding BP' is energized to uncouple the brake plates 207, 209 from each other to thereby unlock the pawl carriage so as to permit movement thereof by the motors FMP' and SMP'.

In like manner to the pawl carriage 165, the machine slide 151 may be moved by either a fast speed motor FMS or by a slow speed motor SMS. The motor FMS is a three wire reversible motor adapted to move slide 151 at fast speed either leftward or rightward when this motor is coupled to the slide by the energization of the winding FCS of an electromagnetic clutch 211 in the coupling between the motor FMS and the slide. The motor SMS is adapted to move the slide 151 at slow speed in the rightward direction when this last named motor is coupled to the slide by the energization of the winding SCS of an electromagnetic clutch 212 in the coupling between the motor SMS and the slide. Under ordinary circumstances, the slide 151 is locked (i.e., clamped) in position by the electromagnetic brake 210 which is coupled between the slide and an immovable object such as the frame 150 of the machine. Thus, for example, the slide 151 is kept locked in position by the brake at times when a machining operation is taking place on the workpiece carried by the slide. At other times, however, the winding BS of the electromagnetic brake 210 is energized to cause the brake to release the slide to thereby permit the slide to be moved by the motor FMS or the motor SMS.

The operations of the various components shown in Fig. 6 are synchronized to take place in proper sequence by a relay circuit which is located in the control console 183. Details of the relay circuit are shown in Fig. 7. As illustrated therein, the energization of the various relays and other components is accomplished by selectively connecting the same across the bus lines 210, 211. In this figure, the conventions are used that any biasing springs for switches are compression springs, and that normally closed and normally opened contacts are respectively represented by contacts having a diagonal line therethrough, and contacts having no diagonal line therethrough.

The actions of the relays shown in Fig. 7 will best be understood from a description, which will now be given, of an entire cycle of operation of the system. The starting condition assumed for the cycle is the condition where the peg bar 156 is at its zero position at the leftward end of its range of travel, the pawl carriage 165 and the machine slide 151 are also at the leftward ends of their ranges of travel, the actuating finger c9 is retracted, and the entire electrical system shown in Fig. 7 is deenergized. Before the cycle has started, the matrix circuit 185 has been operative to connect in circuit that particular segment s7 which represents the whole units component of the position next selected for the slide 151. The segment s6 has likewise been set to the position where the segment represents the decimal unit component of the position next selected for the machine slide.

The cycle of operations is initiated by pressing the start button SB'. As shown in Fig. 7, this start button has two movable contacts 215 and 216. The movable contacts 215 will always bridge the relay contacts l0 when the start button is pressed. The movable contacts 216 will bridge the relay contacts m0 when the start button is pressed if, at that time, a switch 217 is closed. If the system of Fig. 7 is completely deenergized as has been assumed, the cycle of operations is commenced by pushing start button SB' with the switch 217 being left open. If, on the other hand, the system has just run through a previous cycle of operations under the control of the tape, and is, for that reason, not completely deenergized (as later explained), then the new cycle of operations is commenced by pressing start button SB' with the switch 217 being closed.

Since it has been assumed that the relay system is completely deenergized prior to the start of the cycle being considered, this cycle is initiated by pressing start button SB' with the switch 217 being left opened. When button SB' is so pressed, relay winding L is energized with the following effects. First, the winding becomes self-holding by closure of the contacts l0. Second, the relay contacts l1 close to pass current through the path of closed contacts t3, closed contacts m1 and closed contacts v1 to the motor MB which drives the peg bar.

Motor MB when energized through the contacts v1 will rotate in a direction to give the peg bar 156 a rightward movement from its zero position. This peg bar motion continues until the contactor c6 makes contact with the segment s6 which has been set to indicate the decimal component of the position desired for the slide 151. This making of contact between elements c6 and s6 produces a signal which energizes the relay winding M with the following effects. First, the winding M becomes self-holding through closure of the contacts m0. Second, the contacts m1 open to terminate the energization of the motor MB. Third, the contacts m2 close to render energized the winding BP' of the electromagnetic brake 208 which normally clamps the pawl carriage 165 in position. When winding BP' is so energized, the pawl carriage is unclamped so that it is free to move.

The same closure of contacts m2, which causes pawl carriage 165 to be released by its brake, also causes energization, first, of the winding FCP' of the electromagnetic clutch 205, and, second, of the fast speed motor FMP' through the contacts w1. When the winding FCP' and the motor FMP' are so energized, the motor will be coupled to the pawl carriage to move the pawl carriage at fast speed in the rightward direction. This motion of the pawl carriage continues until the contactor c7 on the pawl carriage makes contact with that particular segment s7 on the segment bar 177 which has been selectively connected in circuit to represent the whole units component of the selected position for the machine slide 151.

When contactor c7 so makes contact with the particular segment s7 representing the selected whole units component, a signal is produced which energizes a relay winding N. Winding N when energized has the following effects. First, the winding becomes self-holding through closure of the relay contacts n0. Second, the contacts n1 close to disable the contactor c7 in the event that this contactor crosses the connected segment s7 in the reverse (i.e. leftward) direction. Third, the contacts n2 open to deenergize the fast speed pawl motor FMP', and, further, to deenergize the clutch winding FCP' so that the motor FMP' becomes uncoupled from the pawl carriage 165. Fourth, the contacts n3 close to energize the winding SCP' of the electromagnetic clutch 206, and to energize the slow speed pawl motor SMP'. Fifth, the contacts n4 close to energize the winding SP' for the pawl solenoid. Sixth, the contacts n5 close to start into operation a self-resetting timer Q.

At the time that the contactor c7 on the pawl carriage makes contact with the connected segment s7 on the segment bar, the tooth 162 of the pawl will be positioned about half way between the pin 160 which represents the whole units component of the selected slide position and the pin which is next to the right of the first mentioned pin. Accordingly, the pawl tooth will be properly positioned to enter the path of the pins to the right of the selected pin when the pawl 164 is angularly shifted towards the peg bar 156 by the energization of the pawl solenoid SP' which follows on the energization of the relay winding N. At the same time that the tooth of the pawl is so advanced into the pin path, the now energized slow speed pawl motor SMP' becomes coupled through the now energized electromagnetic clutch 206, to move the pawl carriage slowly to the left. Accordingly, the bearing face 162 of the pawl will move slowly leftward to engage with the pin 160 representing the whole units component of the selected position for the machine slide 151. When such engagement does take place between the pawl and the mentioned pin 160, the actuating pin s9 on the pawl carriage will be positioned to indicate both the whole units component and the decimal units component of the position desired for the machine slide. The torque of the motor SMP' is sufficiently low and/or enough slippage occurs in the clutch 206 so that the pawl is maintained in engagement under light pressure with the selected pin. This light pressure contact does not produce any change in the positional setting of the peg bar.

It will be recalled that one of the effects of the energization of winding N is to set into operation a timer Q. This timer runs for a period long enough to assure that the pawl has engaged the selected pin 160. Thereafter, the timer Q has the following effects. First, the relay contacts q1 are opened by the timer to deenergize the brake winding BP' to thereby cause the electromagnetic brake 208 to reclamp the pawl carriage 165 in position. Second, the contacts q2 open to deenergize the slow speed pawl motor SMP' and, further, to deenergize the clutch winding SCP' whereby the last named motor becomes uncoupled from the pawl carriage. Third, the contacts q3 close to energize the winding BS of the electromagnetic brake 210 for the machine slide 151. This energization of winding BS causes the mentioned brake to release the machine slide so that the slide is now free to move. Fourth, the contacts q4 close to energize the windings FCS of the electromagnetic clutch 211, and, further, to energize the fast speed motor FMS for the machine slide through the normally closed contacts x1. The now energized motor FMS will, hence, be coupled through the now energized clutch 211 to the slide 151 to drive this slide at fast speed leftward. Fifth, a pair of contacts q5 close to enable the contactor c8 on the slide 151 to produce a signal when this contactor makes contact with the segment s8 on the pawl carriage 165.

The fast leftward motion of the slide 151 continues until the contactor c8 is actually brought into contact with the segment s8. This making of contact between the element c8 and s8 produces an electric signal which energizes a relay winding R. The energization of winding R has the following effects. First, the winding R becomes self-holding through closure of the contacts r0. Second, the contacts r1 open to deenergize clutch winding FCS, and further, to deenergize the fast speed slide motor FMS. In this manner the motor FMS is both stopped and is uncoupled from the slide 151. Third, the contacts r2 close to energize the winding SCS of the electromagnetic clutch 212, and, further to energize the slow speed slide motor SMS. The motor SMS, when so energized, becomes coupled to the slide 151 through the now energized clutch 212 to start to move the slide 151 slowly to the right. As a fourth effect of the energization of winding R, a pair of contacts r3 close to energize the solenoid SC for the actuating finger c9 on the slide 151. The solenoid SC, when so energized, serves to advance the actuating finger c9 outward so that the finger is prepared to engage with the actuating pin s9 on the pawl carriage 165. Following the actions described, the slide 151 is moved slowly rightward by the motor SMS until the finger c9 makes contact with the pin s9. The making of contact between the elements c9 and s9 produces a signal which energizes a relay winding T. Winding T when energized has the following effects. First, the winding becomes self-holding by closure of a pair of contacts t0 which connect the winding T across the bus lines 210, 211 ahead of the relay contacts l1. Second, the contacts t1 close to supply power momentarily to the tape stepper TS. The power supplied the stepper is only momentary for the reason that, as later explained, another effect of energization of winding T is to disconnect from the power source the part of the relay circuit in which the stepper TS is connected. However, this momentary flow of power through stepper TS serves to actuate the stepper to advance a new coding 71 into the tape reader 72.

As a fourth effect of energization of the winding T, a pair of contacts t2 close to energize a self-resetting timer U whose purpose is later described. As a fifth effect, the energization of winding T produces the opening of a pair of contacts t3. The opening of these last named contacts serves to deenergize the entire relay system excepting for the relay winding L, the relay winding T and the timer U. As a result of this almost complete deenergization of the system, the clutch winding SCS and the slow speed slide motor SMS will both become deenergized, whereby the slow rightward motion of the slide 151 will stop, and the motor SMS will become uncoupled from the slide. As an additional result, the winding BS will become deenergized so that the electromagnetic brake 210 clamps the slide 151 to the position then assumed thereby. As a still further result, the solenoid SC for the actuating finger c9 becomes deenergized, whereby the finger retracts towards the slide 151 in an amount sufficient to let the actuating pin s9 on the pawl carriage pass the finger.

From the foregoing, it will be evident that the operational cycle has now reached the point where the slide 151 has been brought to the position indicated therefor by the tape coding 71 then in the tape reader 72, and that, furthermore, the slide 151 is clamped in this desired position to permit a machining operation to be conducted on the workpiece which is carried by the slide. While this machining operation is going on, it is desirable, in order to save time, to preset the peg bar 156 in such a way that this peg bar represents, by its new position, the decimal unit component of the next position to which the slide 151 is to be moved. This presetting of the peg bar is carried out as follows.

It will be recalled that the energization of relay winding T caused the tape stepper TS to advance a new tape coding 71 into the tape reader 72, and that the energization of winding T also set into operation the self-resetting timer U. When the new tape coding 71 reaches the tape reader 72 to be read out thereby, new digital inputs will be supplied to the digital-to-analog converter 186, and these new inputs will cause the annular ring 194 to rotate until the segment s6 is set to the position where the segment represents the decimal unit component of the new position for the slide now indicated by the new coding 71 in the tape reader. Meanwhile, the timer U is generating a time delay long enough to assure that the segment s6 will have been set to its new position before any further actions take place.

At the end of the time delay generated by timer U, the timer operates to close the contacts u1 which are connected in parallel with the now opened contacts t3. The only immediate effect of this closure of contacts u1 is that the peg bar motor MB starts to run in a direction appropriate to move the peg bar 156 from its previous position to the position where the peg bar will be displaced from "zero" in an amount corresponding to the decimal unit component of the position for the slide which is indicated by the coding 71 which has newly been brought into the tape reader.

The motor MB continues to move the peg bar in this manner until the contactor c6 on the shaft 195 makes contact with the segment s6 on the ring 194. The making of this contact serves to reenergize the relay winding M. This winding M upon reenergization serves, among its other effects, to open a pair of normally closed contacts m4 in the self-holding circuit for relay winding L. When winding M was first energized, near the beginning of the cycle, the opening of contacts m4 had no effect on the self-holding action of winding L, since, at this time, the contact m4 was bridged by the then closed contacts t4. At the time, however, that winding M is reenergized, the contacts t4 are open for the reason that the relay winding T has meanwhile been energized, and has stayed energized. Hence, upon reenergization of winding M, the opening of contacts m4 destroys the self-holding circuit for winding L so that this last named winding becomes deenergized.

When winding L becomes deenergized, the contacts l1 open, and the entire relay circuit becomes deenergized. However, in the interim, the peg bar 156 has been brought to the position therefor which corresponds to the decimal unit component of the position indicated for the machine slide 151 by the new tape coding 71 in the tape reader 72.

A new cycle of operations is commenced by closing the switch 217, and by then pressing the start button SB'. When the switch 217 is closed, the relay winding M will become energized immediately upon the pressing of the start button. When winding M is immediately energized in this manner, the contacts m1 will open so that the peg bar motor MB receives no power. Also, the contacts m2 will close to cause the fast speed pawl motor FMP' to drive the pawl carriage 165 in the appropriate direction as soon as the start button SB' has been pushed. In this manner, in all except the first cycle of operation, the cycle starts with the setting of the pawl, and the cycle ends with the presetting of the peg bar while the machining operation is being carried out on the workpiece.

As mentioned earlier, the tape codings 71 provide information not only as to desired successive positions of the machine slide, but, as well as of the directions of movement which should be taken by the machine slide 151, the peg bar 156 and the pawl carriage 165 in order to obtain such positions. This information appears as direction control signals on the leads 180, 181, 182 to the control console 183 (Fig. 6). In the absence of a signal on any one of these leads, the motor MB, when energized, will be energized through the contacts v1 to move the peg bar 156 to the right. Similarly, the fast pawl motor FMP' will, when energized, be energized through the contacts w1 to drive the pawl carriage 165 to the right. Similarly, the fast slide motor FMS will be energized through the contacts x1 to drive the slide 151 to the right.

If, however, the peg bar 156 must be moved in the leftward direction in order to travel from a previous position to a new position, then a signal is sent over lead 180 to energize the relay winding V. Winding V when energized causes the opening of contacts v1 and the closing of contacts v2 to thereby cause motor MB to rotate in a direction whereby the peg bar will be moved leftward. In like manner, if leftward movement of the pawl carriage is needed, a signal is sent over lead 181 to energize relay winding W to cause opening of contacts w1 and the closing of contacts w2 to thereby cause rotation of fast pawl motor FMP' in a direction imparting leftward movement to the pawl. In like manner, if leftward fast movement of the slide 151 is needed, a signal is sent over lead 182 to energize winding X to cause opening of contacts x1 and closure of contacts x2. This change in contact position will cause the fast slide motor FMS to rotate in such direction that the slide 151 will be moved thereby in the leftward direction.

The above described embodiments being exemplary only, it will be understood that the invention herein comprehends embodiments differing in form or detail from the presently described embodiments. For example, it is obvious that relay circuits other than those described could be used in the practice of the present invention. Also, clutches may be incorporated in the position selecting mechanisms between the servo motor and the annular rings (as, say, between the servo motor 81 and ring 85 in Figure 3) to permit adjustment in the angular phase relation of the segment on the rings and the contactor which is rotated by the shaft inside the ring to make electrical contact with the segment. As taught in our mentioned co-pending application, one, some, or all of the position selecting mechanisms may include two sets of annular rings, shafts and servo-loops, one set being used for "coarse" and one for "fine" setting of position.

Moreover, the sequence of positioning actions may differ somewhat from those disclosed herein. For example, in the case of the linear peg and pawl system it would be in accordance with the invention to preset both the peg bar and the pawl by sequential or simultaneous positioning operations during the time period that a machining operation is being conducted on the workpiece carried by the then clamped machine slide 151.

Accordingly, the invention is not to be considered as limited save as is consonant with the scope of the following claims.

We claim:

1. Apparatus comprising, a machine having a worktable adapted to mount a workpiece, said table being movable in a first predetermined path to preselected positions each having two components respectively representing a displacement in whole units and a displacement of a fraction of a whole unit of said table from a reference datum, a peg member movable in a second predetermined path parallel to said first path, said peg member having spaced at intervals along its extent in said second path a plurality of pegs which represent by their respective locations on said member successive whole units of displacement of said table from said datum, a pawl and a carriage therefor to one side of said peg member, said pawl carriage and peg member being movable relative to each other to enable said pawl to selectively engage any of said pegs, a first contact element supported by said pawl carriage to move with said pawl, a second contact element disposed in the path of movement of said first element, said two contact elements being adapted to relatively move towards each other to make contact with each other, electrical means providing a switch adapted to be closed by such making of contact, position setting means to provide an indication of the fractional unit component of a particular position preselected for said table, in advance of said table reaching said preselected position, by adjusting one of said contact elements to a positional setting in said last named path at which said one contact element is displaced from a reference position therefor in an amount which is representative of said fractional unit component, means to provide an indication of the whole units component of said preselected table position, in advance of said table reaching said preselected position, by bringing about mutual engagement between said pawl and that one of said pegs representing said whole units component, and said means being adapted to render said table positioned at a location displaced from said reference datum in an amount correlated with said indicated whole units component, motor means adapted, when actuated, to impart motion to said table from said location in a direction towards said preselected position subsequent to establishment of said indications by said adjusted contact element and by said engaged pawl, motion coupling means to communicate motion characterizing that so imparted to said table to one of said contact elements to thereby produce relative movement to a making of contact between said two contact elements in accordance with said table motion, electric circuit means responsive to the making of contact between said two contact elements and to the consequent closure of said switch to produce an electric control signal, and motor control means responsive to said signal to de-actuate said motor means to thereby bring said table to rest at said particular preselected table position.

2. Apparatus comprising, a machine having a worktable adapted to mount a workpiece, said table being movable in a first predetermined path to preselected positions each having two components respectively representing a displacement in whole units and a displacement of a fraction of a whole unit of said table from a reference datum, a peg member movable in a second predetermined path parallel to said first path, said peg member having spaced at intervals along its extent in said second path a plurality of pegs which represent by their respective locations on said member successive whole units of displacement of said table from said datum, a pawl and a carriage therefor to one side of said peg member, said pawl carriage and peg member being movable relative to each other to enable said pawl to selectively engage any of said pegs, a first electrical contact element supported by said pawl carriage to move with said pawl, a second electrical contact element disposed in the path of movement of said first element, said two contact elements being adapted to relatively move towards each other to closure to thereby make electrical contact, position setting means to provide an indication of the fractional unit component of a particular position preselected for said table, in advance of said table reaching, said preselected position, by adjusting one of said contact elements to a positional setting in said last named path at which said one contact element is displaced from a reference position therefor in an amount which is representative of said fractional unit component, means to provide an indication of the whole units component of said preselected table position, in advance of said table reaching said preselected position, by bringing about mutual engagement between said pawl and that one of said pegs representing said whole units component, and said means being adapted to render said table positioned at a location displaced from said reference datum in an amount correlated with said indicated whole units component, force providing means to maintain said pawl engaged with said one peg by a force less than that required by said pawl to move said peg member, whereby said peg member constrains the tendency of said pawl to move under the urging of said force, motor means separate from said force providing means and adapted, when actuated, to impart motion to said table from said location in a direction towards said preselected position subsequent to establishment of said indications by said adjusted contact element and by said engaged pawl, motion coupling means to communicate motion characterizing that so imparted to said table to one of said contact elements to thereby produce relative movement to closure between said two contact elements in accordance with said table motion, electric circuit means responsive to the closure and consequent making of electrical contact between said two contact elements to produce an electric control signal, and motor means responsive to said signal to de-actuate said control motor means to thereby bring said table to rest at said particular preselected table position.

3. Apparatus comprising, a machine having a worktable adapted to mount a workpiece, said table being movable in a first predetermined path to preselected positions each having two components respectively representing a displacement in whole units and a displacement of a fraction of a whole unit of said table from a reference datum, a peg member movable in a second predetermined path parallel to said first path, said peg member having spaced at intervals along its extent in said second path a plurality of pegs which represent by their respective locations on said member successive whole units of displacement of said table from said datum, a pawl and a carriage therefor to one side of said peg member, said pawl carriage and peg member being movable relative to each other to enable said pawl to selectively engage any of said pegs, a first electrical contact element supported by said pawl carriage to move with said pawl, a second electrical contact element disposed in the path of movement of said first element, said two contact elements being adapted to relatively move towards each other to closure to thereby make electrical contact, position setting means to provide an indication of the fractional unit component of a particular position preselected for said table, in advance of said table reaching said preselected position, by adjusting one of said contact elements to a positional setting in said last named path at which said one contact element is displaced from a reference position therefor in an amount which is representative of said fractional unit component, means to provide an indication of the whole units component of said preselected table position, in advance of said table reaching said preselected position, by bringing about mutual engagement between said pawl and that one of said pegs representing said whole units component, and said means being adapted to render said table positioned at a location displaced from said reference datum in an amount correlated with said indicated whole units component, force providing means to maintain said pawl engaged with said one peg by a force less than that required by said pawl to move said peg member, whereby said peg member constrains the tendency of said pawl to move under the urging of said force, motor means separate from said force providing means and adapted, when actuated, to impart motion to said table from said location in a direction towards said preselected position subsequent to establishment of said indications by said adjusted contact element and by said engaged pawl, motion coupling means to communicate motion characterizing that so imparted to said table to one of said contact elements to thereby produce relative movement to closure between said two contact elements in accordance with said table motion, electric circuit control means responsive to the closure and consequent making of electrical contact between said two contact elements to produce an electric control signal, motor control means responsive to said signal to de-actuate said motor means to thereby bring said table to rest at said particular preselected table position, and table brake means also responsive to said control signal to lock said table to said particular preselected position subsequent to de-actuation of said motor means.

4. Apparatus comprising, a machine having a worktable adapted to mount a workpiece, said table being movable in a first predetermined path to preselected positions each having two components respectively representing a displacement in whole units and a displacement of a fraction of a whole unit of said table from a reference datum, a peg member movable in a second predetermined path parallel to said first path, said peg member having spaced at intervals along its extent in said second path a plurality of pegs which represent by their respective locations on said member successive whole units of displacement of said table from said datum, a pawl and a carriage therefor to one side of said peg member, said pawl carriage and peg member being movable relative to each other to enable said pawl to selectively engage any of said pegs, a first electrical contact element supported by said pawl carriage to move with said pawl, a second electrical contact element disposed in the path of movement of said first element, said two contact elements being adapted to relatively move towards each other to closure to thereby make electrical contact, a position selection information source adapted when successively actuated to provide successive electric signal combinations each designating both the fractional unit component and the whole units component of successive positions preselected for said table, position setting means responsive to a given such electric signal combination to provide an indication of the fractional unit component of the table position designated thereby, in advance of said table reaching said designated position, by adjusting one of said contact elements to a positional setting in said last named path at which said one contact element is displaced from a reference position therefor in an amount which is representative of said fractional unit component, means responsive to said given electric signal combination to provide an indication of the whole units component of the table position designated thereby, in advance of said table reaching said designated position, by bringing about mutual engagement between said pawl and that one of said pegs representing said whole units component, and said means being adapted to render said table positioned at a location displaced from said reference datum in an amount correlated with said indicated whole units component, motor means adapted, when actuated, to impart motion to said table from said location in a direction towards said preselected position subsequent to establishment of said indications by said adjusted contact element and by said engaged pawl, motion coupling means to communicate motion characterizing that so imparted to said table to one of said contact elements to thereby produce relative movement to closure between said two contact elements in accordance with said table motion, electric circuit means responsive to the closure and consequent making of electrical contact between said two contact elements to produce an electric control signal, motor control means responsive to said control signal to de-actuate said motor means to thereby bring said table to rest at the position designated by said given electric signal combination, table brake means responsive to said control signal to lock said table to said particular preselected position subsequent to de-actuation of said motor means, stepper means responsive to said control signal to actuate said information source to provide a new electric signal combination next following said given combination, and means also responsive to said control signal to render said position setting means responsive to said new electric signal combination to thereby set said adjustable contact element, in accordance with the fractional unit component designated by the new combination, while said table remains clamped at the position designated by the previous given electric signal combination.

5. Apparatus comprising, a machine having a worktable adapted to mount a workpiece, said table being movable in a first predetermined path to preselected positions each having two components respectively representing a displacement in whole units and a displacement of a fraction of a whole unit of said table from a reference datum, a peg member movable in a second predetermined path parallel to said first path, said peg member having spaced at intervals along its extent in said second path a plurality of pegs which represent by their respective locations on said member successive whole units of displacement of said table from said datum, a pawl and a carriage therefor to one side of said peg member, said pawl carriage and peg member being movable relative to each other to enable said pawl to selectively engage any of said pegs, a first electrical contact element supported by said pawl carriage to move with said pawl, a second electrical contact element disposed in the path of movement of said first element, said two contact elements being adapted to relatively move towards each other to closure to thereby make electrical contact, a position selection information source adapted, when successively actuated, to provide successive electric signal combinations each designating both the fractional unit component and the whole units component of successive positions preselected for said table, position setting means responsive to a given such electric signal combination to provide an indication of the fractional unit component of the table position designated thereby, in advance of said table reaching said designated position, by adjusting one of said contact elements to a positional setting in said last named path at which said one contact element is displaced from a reference position therefor in an amount which is representative of said fractional unit component, means responsive to said given electric signal combination to provide an indication of the whole units component of the table position designated thereby, in advance of said table reaching said designated position, by bringing about mutual engagement between said pawl and that one of said pegs representing said whole units component, and said means being adapted to render said table positioned at a location displaced from said reference datum in an amount correlated with said indicated whole units component, force providing means to maintain said pawl engaged with said one peg by a force less than that required by said pawl to move said peg member, whereby said peg member constrains the tendency of said pawl to move under the urging of said force, motor means separate from said force providing means and adapted, when actuated, to impart motion in said table from said location in a direction towards said preselected position subsequent to establishment of said indications by said adjusted contact element and by said engaged pawl, motion coupling means to communicate motion characterizing that so imparted to said table to one of said contact elements to thereby produce relative movement to closure between said two contact elements in accordance with said table motion, electric circuit means responsive to the closure and consequent making of electrical contact between said two contact elements to produce an electric control signal, motor control means responsive to said control signal to de-actuate said motor means to thereby bring said table to rest at the position designated by said given electric signal combination, table brake means also responsive to said control signal to lock said table to said particular preselected position subsequent to de-actuation of said motor means, stepper means responsive to said control signal to actuate said information source to provide a new electric signal combination next following said given combination, and means also responsive to said control signal to render said position setting means responsive to said new electric signal combination to thereby set said adjustable contact element, in accordance with the fractional units component designated by the new combination, while said table remains clamped at the position designated by the previous given electric signal combination.

6. Apparatus comprising, a worktable movable in a predetermined path, a member carrying spaced pegs, a pawl adapted to selectively engage said pegs one at a time, said peg member and pawl forming a position selecting combination and being disposed in relation to said path to indicate by pawl engagements with successive pegs successive whole unit displacements of said table in said path, a first contact element adjustable in displacement relative to a reference position for said table in said path to thereby indicate a fractional amount of unit displacement of said table from said reference position, said element and said peg and pawl combination being relatively disposed to render the whole unit displacements indicated by said combination algebraically additive with the fractional unit displacement indicated by said element, whereby said element and peg and pawl combination are adapted to conjointly indicate a preselected position for said table which is spaced in said path from said reference position by the algebraic sum of the displacements respectively indicated by said element and by said peg and pawl combination, means to move said table in the direction towards said preselected position, a second contact element adapted to undergo relative movement towards and culminating in a making of contact with said first element in accordance with the movement of said table towards said preselected position, said second element being disposed in relation to said first element to have, in said relative movement, an instantaneous separation from said first element which is proportional to the instantaneous amount of separation of said table from said preselected position, electrical means providing a switch adapted to be closed by the making of contact of said two elements, and electric circuit means responsive to the closure of said switch to produce a signal indicating that said table has reached said preselected position.

7. Apparatus comprising, a worktable movable in a predetermined path, a member carrying spaced pegs, a pawl adapted to selectively engage said pegs one at a time, said peg member and pawl being disposed in relation to said path to indicate by pawl engagements with successive pegs successive positions of said table in said path, means to bring said pawl into engagement with a selected one of said pegs to thereby indicate one of said positions as a selected position for said table, motor means to move said table in a direction towards said selected position, and force providing means separate from said motor means to maintain said pawl engaged with said one peg by a force less than that required by said pawl to move said peg member while said table is moving towards said selected position, said peg member thereby constraining the tendency of said pawl to move under the urging of said force.

8. Apparatus comprising, a worktable movable in a predetermined path, a member carrying spaced pegs, a pawl adapted to selectively engage said pegs one at a time, said peg member and pawl being disposed in relation to said path to indicate by pawl engagements with successive pegs successive positions of said table in said path, motor means adapted when actuated to move said table in the direction towards a selected position indicated therefor by said peg member and engaged pawl, means to produce a control signal when said table reaches said selected position, motor control means responsive to said control signal to de-actuate said motor means to thereby bring said table to rest at said selected position, and table locking means also responsive to said control signal to thereafter lock said table in place at said selected position.

9. Apparatus comprising, a worktable movable in a predetermined path, a position selecting system including a member carrying a peg and a pawl adapted to selectively engage said pegs one at a time, said peg member and pawl being components of a position selecting system and being disposed in relation to said path to indicate by pawl engagements with successive pegs successive positions of said table in said path, motor means adapted when actuated to move said table in the direction towards a selected position indicated therefor by said peg member and engaged pawl, means to produce a control signal when said table reaches said selected position, motor control means responsive to said control signal to de-actuate said motor means to thereby bring said table to rest at said selected position, table locking means also responsive to said control signal to thereafter lock said table in place at said selected position, and means to preset at least part of said peg and pawl system to provide an indication in accordance with a new selected position for said table while said table remains locked at the position previously selected therefor.

10. Apparatus comprising, a member carrying spaced pegs, a pawl disposed to one side of said member and adapted to engage a selected one of said pegs, first motor means operable to move said pawl at fast speed towards a position offset in a first direction from said one peg by movement of said pawl relative to said peg member in either said first direction or in a second direction opposite to the first in accordance with the initial direction of displacement of said pawl relative to said offset position, and second motor means operable after said pawl has reached said offset position by fast relative movement from either direction to bring said pawl into engagement with said one peg by movement of said pawl relative to said one peg at slow speed in said second direction.

11. Apparatus comprising, a member carrying spaced pegs, a pawl disposed to one side of said member and adapted to engage a selected one of said pegs, first motor means to initially move said pawl at fast speed in either one of two opposite directions towards a pre-engaging position which is offset from the selected peg in a predetermined direction, and which lies between the selected peg and the peg adjacent thereto in said predetermined direction, the direction of initial fast movement of said pawl being determined by the initial direction of displacement of said pawl relative to said selected peg, second motor means to move said pawl at slow speed from said offset position into engagement with said selected peg, first motor control means synchronized in operation with the fast movement of said pawl and operable upon arrival of said pawl at said pre-engaging position to de-energize said first motor and to energize said second motor means, and second motor control means selectively operable when said pawl movement is in a predetermined one of said two opposite directions to disable said first control means until said pawl has overshot said offset position by a predetermined amount of overshoot, said second control means being further operable after said pawl has undergone said overshoot to reverse said first motor means to thereby reverse the direction of fast movement of said pawl.

12. Apparatus comprising, a member carrying pegs spaced at approximately equal intervals in a peg path on said member, a pawl adapted by relative movement with said member to be brought into proximity with a selected one of said pegs and to engage the selected peg, means mounting said pawl, and a star gear mounted by said mounting means to mesh with said pegs and to rotate in response to said relative movement to provide by the amount of rotation thereof an indication of the amount of said relative movement.

References Cited in the file of this patent

UNITED STATES PATENTS

| | | |
|---|---|---|
| 2,680,993 | Osplack | June 15, 1954 |
| 2,807,175 | Tandler et al. | Sept. 24, 1957 |
| 2,835,042 | Tandler et al. | May 20, 1958 |

FOREIGN PATENTS

| | | |
|---|---|---|
| 776,104 | France | Oct. 22, 1934 |

UNITED STATES PATENT OFFICE

CERTIFICATE OF CORRECTION

Patent No. 2,985,038                          May 23, 1961

William S. Tandler et al.

It is hereby certified that error appears in the above numbered patent requiring correction and that the said Letters Patent should read as corrected below.

Column 1, line 38, for "impossible" read -- possible --; column 4, line 61, for "statoinary" read -- stationary --; line 74, for "virtus" read -- virtue --; column 7, line 37, for "positon" read -- position --.

Signed and sealed this 7th day of November 1961.

(SEAL)
Attest:

ERNEST W. SWIDER
Attesting Officer

DAVID L. LADD
Commissioner of Patents
USCOMM-DC